US009235320B2

(12) United States Patent
Kinn

(10) Patent No.: US 9,235,320 B2
(45) Date of Patent: Jan. 12, 2016

(54) PHANTOM IMAGE DATA BANK (3D)

(75) Inventor: Uwe Kinn, Mainz (DE)

(73) Assignee: Landeskriminalamt Rheinland-Pfalz (DE)

( * ) Notice: Subject to any disclaimer, the term of this patent is extended or adjusted under 35 U.S.C. 154(b) by 274 days.

(21) Appl. No.: 14/008,370

(22) PCT Filed: Mar. 30, 2012

(86) PCT No.: PCT/EP2012/001421
§ 371 (c)(1),
(2), (4) Date: Sep. 30, 2013

(87) PCT Pub. No.: WO2012/130470
PCT Pub. Date: Oct. 4, 2012

(65) Prior Publication Data
US 2014/0026102 A1    Jan. 23, 2014

(30) Foreign Application Priority Data
Mar. 31, 2011  (DE) .......................... 10 2011 015 730

(51) Int. Cl.
*G06F 3/0481* (2013.01)
*G06T 11/00* (2006.01)

(52) U.S. Cl.
CPC ............ *G06F 3/04815* (2013.01); *G06T 11/00* (2013.01)

(58) Field of Classification Search
CPC .................................................... G06F 3/04815
USPC ........................................................ 715/852
See application file for complete search history.

(56) References Cited

U.S. PATENT DOCUMENTS 2,974,426 A * 3/1961 McDonald ........... A61B 5/1176
273/157 A
4,045,883 A * 9/1977 Ryan ................... G06K 9/00281
434/155

(Continued)

FOREIGN PATENT DOCUMENTS

WO         9927838        6/1999
WO      2012130470       10/2012

OTHER PUBLICATIONS

International Preliminary Report on Patentability dated Oct. 2, 2013 issued in International Application No. PCT/EP2012/001421.

(Continued)

*Primary Examiner* — Reza Nabi
(74) *Attorney, Agent, or Firm* — Onello & Mello, LLP

(57) ABSTRACT

The invention relates to the generation of phantom images on the basis of an image data bank (10), comprising a plurality of first image data elements, wherein each first image data element displays a facial section of a human face in a first view/perspective, and wherein the image data bank (10) comprises a corresponding second image data element for each first image data element such that the second image data element displays, at least in part, the same facial section of the same human face in a second view/perspective. The user thereby selects a first image data element (26*a*) of a first facial section of a human face and a first image data element (26*b*) of a second facial section of a human face. The selected first image data elements are graphically displayed in a first display region (22) of a graphic user interface. Furthermore, the second image data elements (28*a*, 28*b*) corresponding to the selected first image data elements are identified, and are graphically displayed in a second display region (24) of the graphic user interface.

28 Claims, 4 Drawing Sheets

(56) References Cited

U.S. PATENT DOCUMENTS

Figure 1:
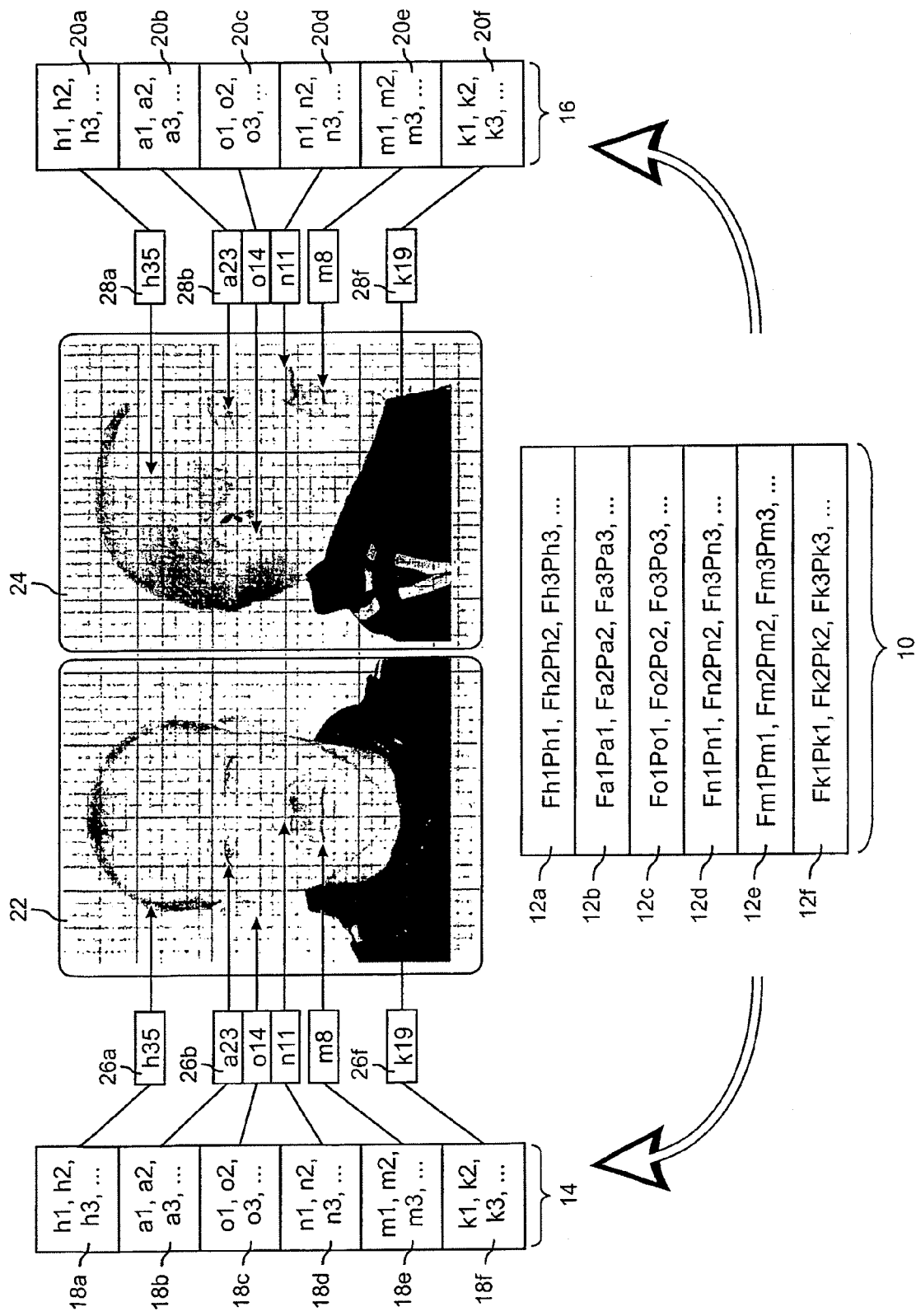

| | | | | |
|---|---|---|---|---|
| 5,057,019 | A * | 10/1991 | Harvey | A61B 5/1176 434/155 |
| 5,375,195 | A * | 12/1994 | Johnston | G06T 11/00 345/630 |
| 5,649,086 | A | 7/1997 | Belfer et al. | G06T 13/40 345/441 |
| 5,818,457 | A * | 10/1998 | Murata et al. | G06T 11/00 345/629 |
| 6,381,346 | B1 * | 4/2002 | Eraslan | G06K 9/00221 345/420 |
| 6,549,200 | B1 * | 4/2003 | Mortlock | G06T 15/04 345/419 |
| 6,731,302 | B1 * | 5/2004 | Cote | G06T 11/00 345/619 |
| 7,623,687 | B2 * | 11/2009 | Bronstein | G06T 17/00 345/419 |
| 7,693,564 | B2 * | 4/2010 | Kelliher | G06T 5/50 382/128 |
| 8,340,366 | B2 * | 12/2012 | Masuda | G06F 21/32 382/117 |
| 8,910,082 | B2 * | 12/2014 | Aarabi | G06F 3/0482 715/834 |
| 2003/0063794 | A1 * | 4/2003 | Rubinstenn et al. | A45D 44/005 382/154 |
| 2003/0065255 | A1 * | 4/2003 | Giacchetti et al. | A45D 44/005 600/407 |
| 2004/0085324 | A1 * | 5/2004 | Yao | G06T 11/001 345/581 |
| 2006/0067573 | A1 * | 3/2006 | Parr | G06K 9/00275 382/154 |
| 2007/0052726 | A1 * | 3/2007 | Wright | G06T 11/00 345/629 |
| 2010/0158325 | A1 * | 6/2010 | Piramuthu | G06K 9/00234 382/118 |
| 2011/0013003 | A1 * | 1/2011 | Thompson | G06K 9/00228 348/77 |
| 2012/0183238 | A1 * | 7/2012 | Savvides | G06K 9/00201 382/285 |
| 2014/0026102 | A1 * | 1/2014 | Kinn | G06T 11/00 715/852 |
| 2014/0294257 | A1 * | 10/2014 | Tussy | G06F 17/30247 382/118 |

OTHER PUBLICATIONS

German Office Action dated Nov. 28, 2011 issued in corresponding German Application No. 10 2011 015 730.1.

International Search Report and Written Opinion dated Sep. 4, 2012 issued in corresponding International Application No. PCT/EP2012/001421.

Brunelli, et al., "SpotIt! An Interactive Identikit System," Graphical Models and Image Processing, Sep. 1996, pp. 399-404, vol. 58, No. 5, Academic Press, Inc.

Blanz, et al., "Creating Face Models from Vague Mental Images," Eurographics Association, 2006, vol. 25, No. 3, pp. 645-654, Blackwell Publishing, Oxford, UK and Malden, MA.

Davies, et al., "Facial Composite Production: A Comparison of Mechanical and Computer-Driven Systems," Journal of Applied Psychology, 2000, vol. 85, No. 1, pp. 119-124, American Psychological Association, Inc.

* cited by examiner

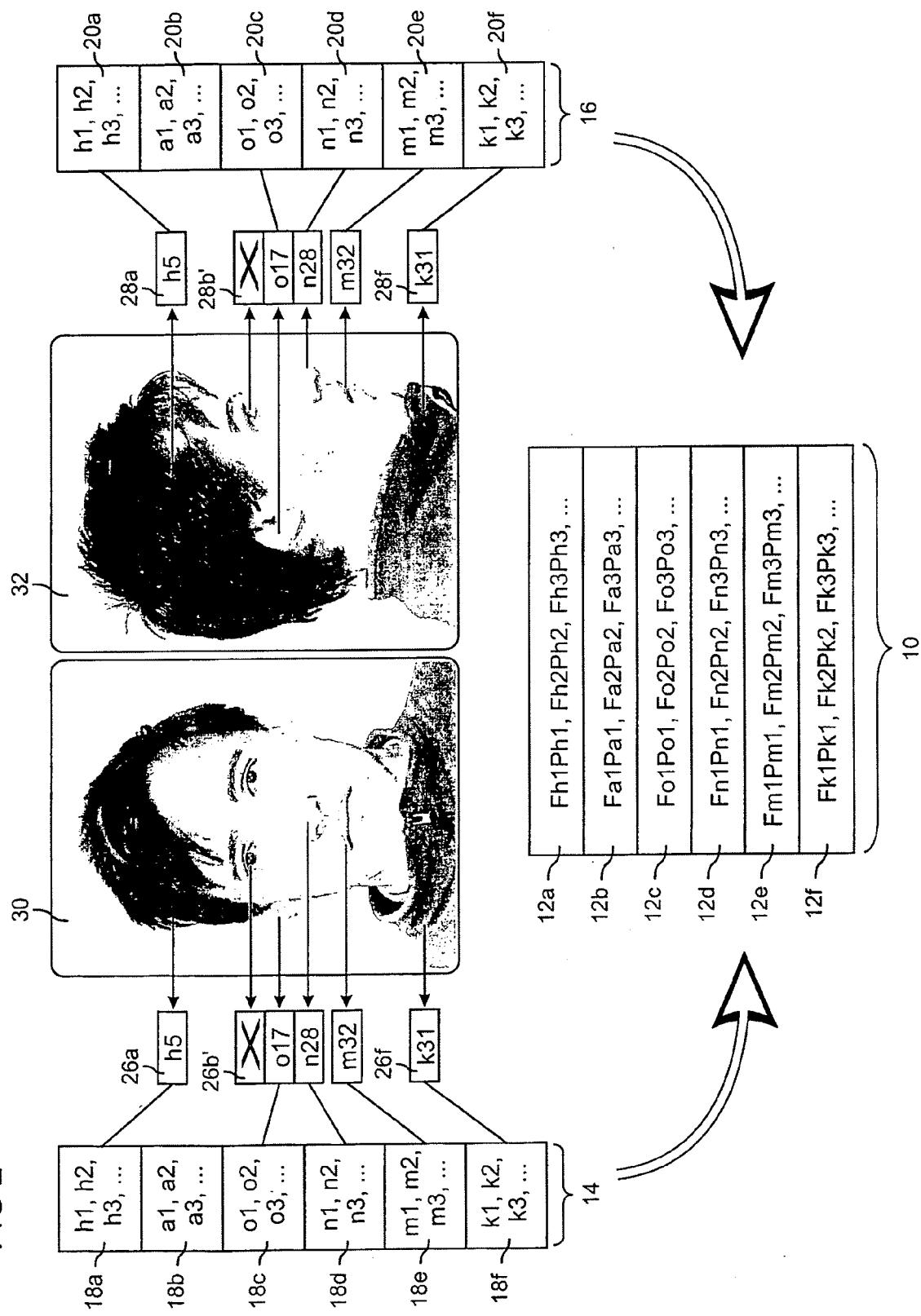

PHANTOM IMAGE DATA BANK (3D)

The present invention serves to construct facial composites for representing human faces using at least two sub-databases specially connected to each other in their structures. This ensures that a facial composite representation of a face can be composed anatomically consistently in various perspectives at the same time.

Facial composites constructed on the basis of testimonies or with direct help of eye-witnesses are of particular importance to the tracing of offenders. While in the past trained artists constructed an image of a possible offender as a free-hand sketch in consultation with the corresponding eye-witness, the construction of facial composites on the basis of ready-made drawing elements in the form of individual parts of the face has become increasingly comfortable and efficient with the introduction of computers and the use of large databases.

In order to be able to make use of ready-made representations of individual parts of the face so as to freely combine them for the construction of facial composites, these representations all have to be present in a standardized or same orientation of the face. For example, a ready-made eye area designed for a head slightly inclined to the right cannot be combined with a nose area showing slightly to the left. Conventionally, facial composites constructed on the basis of image parts from a database are represented uniformly in one view, for example in the front view. Therefore, all individual image elements are deposited in a database in the frontal orientation and can thus be freely combined with each other. Particularly the front view often provides a comparatively high degree of recognition. For example, especially if the respective witness is a victim directly affected by a crime or the offender directly looked at the victim for other reasons, a facial composite can come very close to the actual offender image particularly in the front view.

However, the chances of success of an investigation by means of a facial composite do not only depend on the best possible reproduction of the offender image, but also on its expressiveness to recognize the offender in other situations at a later time, for example on video recordings. Particularly when it comes to a comparison with video recordings, it is often desirable not to be restricted to the conventional front view in investigations by means of a facial composite. For example, in video recordings made by a surveillance camera, it is rather rare that an offender looks directly into the camera.

In search of a solution to this problem, various concepts were considered as part of the development of the invention. Especially for the later flexible usability of a facial composite would a fully three-dimensional model image of the offender be desirable. However, the fully three-dimensional construction of an offender image is associated with significant problems concerning simple operability of a corresponding computer system and increased requirements on the computing power.

It is the object of the present invention to improve the construction of facial composites such that the expressiveness and flexibility of facial composites for use in investigations is improved without making the process of constructing a facial composite much more complicated.

This object is solved by a method of constructing facial composites, a method of creating or expanding an image database for facial composites, a system for constructing facial composites, and a computer program product including the features according to the independent claims. Preferred embodiments are subject of the dependent claims.

In one aspect, the invention provides a computer-implemented method of constructing facial composites. This method comprises providing an image database comprising a plurality of first image data elements, each first image data element representing a part of the face of a human face in a first view (perspective), and wherein for every first image data element the image database comprises a corresponding second image data element such that the second image data element represents at least partially the same part of the face of the same human face in a second view (perspective).

Thus, the provided image database comprises pairs of mutually assigned, corresponding image data elements with each a first and a second image data element. In this regard, the image database can be considered to be composed of specially connected sub-databases, each sub-database representing a specific perspective. For example, a first sub-database can exclusively include image data elements for a first perspective (e.g. front view), and a second sub-database can exclusively include image data elements for a second perspective (e.g. profile), each image data element of the second sub-database being uniquely assigned to a corresponding image data element of the first sub-database, and vice versa. In particular, the corresponding image data elements are associated with each other by the image database.

Within the scope of this description, the image data elements will be referred to as corresponding image data elements when they substantially or at least partially represent the same part of the face of the same human face in various perspectives. To this end, the image data elements particularly represent photographic images of parts of real faces. Particularly preferably, they are formed by specially edited parts of photos of real persons, as will be described in more detail below. Due to the various perspectives, it may happen that in one of the corresponding image data elements an area of the face is partially covered, which in another one of the corresponding image data elements is represented. Here, we are therefore talking about "substantially" or "at least partially" the same part of the face. For example, in a profile view of a human nose area, the averted nostril can be covered while it is visible in a corresponding front view. Nevertheless, the two views relate "at least partially" or "substantially" to the same part of the face, i.e. in this case the nose area. Accordingly, the image data elements are referred to as corresponding image data elements.

Moreover, the method comprises acquiring a user input for selection of a first image data element of a first part of the face of a human face—i.e. an image data element representing a first part of the face (e.g. hair and/or eyes and/or ears, ... ) of a human face in a first perspective—and acquiring a user input for selection of a first image data element of a second part of the face of a human face—i.e. an image data element representing a second part of the face (nose and/or mouth, ... ) of a human face in the first perspective. Here, the first image data element of the second part of the face can be selected largely independent of the first image data element of the first part of the face. It is merely desired that the second part of the face differ from the first part of the face in order to not integrate certain areas of the face twice (e.g. to noses) into the facial composite to be constructed.

The first image data elements selected by the acquired user input are graphically represented in a first display area of a graphical user interface. Preferably, it is a computer display or a section (window) in a computer display. Thereby, the user can control and track the construction of the facial composite from individual image data elements in the usual way.

Further, the method comprises determining the corresponding second image data elements corresponding to the selected first image data elements from the provided image database. Due to the structure of the provided image database according to the invention, this is possible for any selection and any combination of first image data elements. Particularly preferably, the respectively corresponding second image data element is determined automatically.

Finally, the method comprises graphically representing the determined second image data elements in a second display area of the graphical user interface. Preferably, it is a computer display or a section (window) in a computer display. By determination of the corresponding image data elements corresponding to the image data elements selected by the user, a further facial composite of the potential offender in a second perspective is formed together with the facial composite in the first perspective constructed by the user (particularly in consultation with an eye-witness) in a very simple way. With respect to the anatomy of the individual parts of the face, the second facial composite is automatically consistent with the facial composite in the first perspective.

Within the scope of the development of the invention, it turned out that in practice it is difficult for witnesses to follow the construction of facial composites in a simulated three-dimensional representation. Even if, ultimately, a three-dimensional representation of an offender seems to be desirable for the further tracing, the witness-assisted construction of a facial composite on the basis of a representation that is three-dimensional from the start proves to be difficult. This is not least because of the high demands to be placed on a computing system and the necessary experience of the user in the operation of a three-dimensionally simulated representation. An essential problem also is the representation in three dimensions, which appears to be very complex to the witness, which makes the construction of expressive facial composites more difficult.

With the present invention, however, it is very easy to construct a facial composite on the basis of a two-dimensional representation in a seemingly familiar way, while the structure of the database according to the invention, in which every image data element selected for the construction of the facial composite is assigned a corresponding image data element, provides additional information on a further spatial dimension due to the various perspectives, said additional information matching the corresponding parts of the face in the first perspective in an anatomically consistent way.

Surprisingly, it was found that the expressiveness of facial composites constructed according to the present invention, i.e. the chance to recognize an offender, is in many cases greater than with facial composites constructed on the basis of fully three-dimensional representations. A possible explanation for this efficiency of the present invention is that the construction of comparably detailed facial composites by means of a fully three-dimensional representation surprisingly takes more time in practice than the construction of a corresponding facial composite according to the present invention. Both the unexpected higher demands on the witness's ability to concentrate in the case of a fully three-dimensional representation and the sometimes long time involved compared to a facial composite representation according to the present invention in many cases mean that facial composites constructed according to the invention have a better expressiveness in the end. Moreover, the faster preparation saves time and costs. In connection with the improvement in quality, the invention provides a substantial increase in efficiency as a whole.

In a preferred embodiment, it is possible to construct the facial composite in a conventional way on the basis of a single view/perspective. For example, the witness could have seen the offender mainly in the front view, or mainly or exclusively remember the front view. To this end, the method comprises activating a 2D editing mode in which during the acquisition of user inputs for selecting and/or for positioning and/or orienting and/or dimensioning first image data elements, the first display area, but not the second display area is represented graphically. The second facial composite in the first perspective is formed in the background so to speak, without the witness being distracted or confused thereby. Thus, the construction of the facial composite is at least initially exclusively performed on the basis of the first view, wherein it is preferably possible to select which one of a plurality of perspectives provided by the database, in particular in the form of sub-databases, is to be displayed and edited in the activated 2D editing mode as the "first" perspective.

After completion of the facial composite in the 2D editing mode on the basis of the first perspective, a second facial composite in the second perspective is automatically available, which can be very useful for the further investigation. Preferably, it is also possible to switch between the perspectives and/or to fade in the second display area after construction of the facial composite in the first perspective (or also in between) in order to make corrections on the facial composite on the basis of this view, if necessary. This is particularly helpful if the witness has seen the offender also in the second perspective (at least for a short time).

Preferably, the method further comprises acquiring a user input for positioning and/or orienting and/or dimensioning the representation of the first image data element of the second part of the face in the first display area relative to the representation of the first image data element of the first part of the face in the first display area. The user can thereby shift individual parts of the face relative to each other and/or rotate them and/or change their relative size (e.g. height and/or width). Particularly preferably, the user input for positioning and/or orientating and/or dimensioning is performed by means of the graphical user interface, in particular by the user selecting a representation of the image data element (e.g. the representation of the nose) by means of a cursor or mouse pointer or any other graphical pointer for an input device or by means of a touchpad or touchscreen, and by shifting and/or rotating and/or changing size and/or shape and/or color or intensity of said representation by means of the corresponding input device (e.g. mouse, keyboard touchpad, touchscreen, . . . ).

The method preferably further comprises adapting the position or orientation or dimension of the representation of the corresponding second image data element of the second part of the face in the second display area relative to the representation of the second image data element of the first part of the face in the second display area depending on the acquired user input for positioning and/or orienting and/or dimensioning in the first display area. Thus, the second facial composite, i.e. the facial composite in the second perspective forming at the same time, remains fully consistent with the facial composite constructed and displayed in the first display area not only with respect to the anatomy of the individual parts of the face, but also with respect to their relative composition.

In one embodiment, it is possible to perform the positioning and/or orienting and/or dimensioning of the representation of the second image data elements in the second display area manually. To this end, the first and second display areas are preferably represented next to each other at the same time, and a pattern of auxiliary lines (e.g. a grid) is represented in the first and second display areas particularly in a continuous fashion. On the basis of these auxiliary lines, an adaptation of the position and/or orientation and/or dimension can be performed very easily by the user. Particularly preferably, however, an adaptation of the position and/or orientation and/or dimension of the representation of the second image data element is performed automatically on the basis of the acquired user input for positioning and/or orienting and/or dimensioning the representation in the first display area, i.e. without the user having to make a further user input specially for positioning and/or orienting and/or dimensioning the representation in the second display area.

In a preferred embodiment, at least one of the first and second perspectives is a partial profile view. Particularly preferably, the method comprises determining first and second editing areas of the first and/or second display area(s), i.e. first and second editing areas in at least the display area that represents the at least one partial profile view such that the first editing area represents a side of the face partially averted in a viewing direction in the represented perspective, while the second editing area represents a side of the face facing toward the viewing direction. Thus, the represented face is divided into two editing areas along a center line (profile line) of the face, which due to the perspective oblique representation in the display area of the user interface have different sizes.

In a preferred embodiment, the method further comprises determining a (first) scaling factor which in distinction to further, yet to be described scaling factors of preferred embodiments can also be referred to as a partial profile-partial profile scaling factor, since it associates the two sides of the face in the partial profile view with each other. The determination of the partial profile-partial profile scaling factor can be performed in various ways. In a preferred embodiment, this scaling factor is deposited in the database and is retrieved from the database for editing the partial profile view of the facial composite. As the image data elements of the at least one partial profile view preferably belong to the same perspective, i.e. to the same viewing and capturing angle relative to the front view, always the same scaling factor deposited therefor in the database is used for this at least one partial profile view in a preferred embodiment. In a preferred embodiment, the capturing angle relative to the front view is in the range from approximately 35° to approximately 45°. The partial profile-partial profile scaling factor preferably is in the range from approximately 1.5 to approximately 3, more preferably in a range from approximately 1.8 to approximately 2.3, most preferably at a value of approximately 2. This is especially preferred if the capturing angle relative to the front view has a value of approximately 45°.

Further, the method comprises acquiring a user input for graphically editing the representation in the first or second editing area, which comprises shifting at least one pixel of the representation in the first or second editing area and/or a primary editing tool represented in the first or second editing area by a primary position change stipulated by the user input, which includes a primary horizontal and/or a primary vertical component of the position change. Thereby, the user can change areas of the image in an editing area individually. For example, the user can individually adapt the position of an eye or the distance of the eye to the center line of the face and/or the width of a nostril and/or width and/or shape of the mouth in one of the two editing areas directly. To this end, the user uses a corresponding virtual editing tool, which he operates via a computer mouse or a touchpad as the input device, for example. The position of the editing tool in the directly edited image area is represented by a corresponding cursor in the display area, for example. By a mouse click, the user can grasp individual pixels or a plurality of pixels in a surrounding of the current cursor position and shift them within the editing area. The shift can include horizontal and/or vertical components. This shift, which is directly controlled by the user, is referred to as a primary position change herein.

Preferably, a corresponding image area of the other editing area is simultaneously changed as well in order to leave the impression of symmetry of the face unaffected, without the user having to make this adaptation separately. For example, the method particularly comprises simultaneously shifting at least one pixel of the representation in the second or first editing area or a secondary editing tool represented in the second or first editing area by a secondary position change determined depending on the user input and the (first) scaling factor (partial profile-partial profile scaling factor), which includes a secondary horizontal and/or a secondary vertical component such that the secondary horizontal component corresponds to the primary horizontal component scaled by the first scaling factor and the secondary vertical component corresponds to the primary vertical component.

In addition to a primary editing tool, which directly acts on the editing area edited by the user by means of the primary editing tool, the virtual editing tool comprises a secondary editing tool acting on the other (complementary) editing area (i.e. the other side of the face). Its current position within the corresponding editing area can also be displayed by means of a graphical cursor. The position of the secondary editing tool and the position of the graphical elements (e.g. pixels) edited therewith is changed preferably simultaneously with the primary editing tool, but scaled with respect to its movement. Here, the vertical movement of both editing tools is the same. The horizontal component, however, is scaled by the partial profile-partial profile scaling factor and in the opposite direction, so that both horizontal components either face toward the center line of the face or away from it. For example, if the first editing area is edited by the user directly, then the secondary horizontal component is obtained from the primary horizontal component by multiplication with the scaling factor. If, on the other hand, the second editing area is directly edited by the user, then the secondary horizontal component is obtained from the primary horizontal component by division by the scaling factor. In the horizontal direction, this always results in a correspondingly greater change on the representation of the side of the face facing toward the viewer than on the representation of the side of the face averted from the viewer. Even if the conversion by means of a scaling factor represents an anatomical approximation, it turned out that an unexpectedly good acceptance by eye-witnesses is achieved in a very easy way within the scope of construction of facial composites.

In a preferred embodiment, determining first and second editing areas comprises determining a profile line (center line) of the face. Here, the profile line can be determined automatically on the basis of an automated graphical evaluation of contrasts in the display area of the partial profile view. In a preferred embodiment, determining the profile line in the partial profile view comprises determining a profile line in a corresponding profile view and scaling the determined profile line. Thus, the automatic determination of the profile line in the profile view is much easier and more precise. The shape of the profile line in the partial profile view can be derived very easily from the shape of the profile line in the profile view taking the viewing angle in the partial profile view into consideration. For example, the horizontal shape of the profile line is scalded by the factor $\sin(\alpha)$ when a is the viewing angle in the partial profile view relative to the front view. Moreover, contour lines can automatically be determined in the partial profile view as well. In this way, the editing areas in the partial profile view are preferably already fixed.

The described way of the preferably simultaneous editing of both editing areas is not limited to a fixedly deposited scaling factor. In another preferred embodiment, the scaling factor is determined taking the image data elements represented in the partial profile at least partially into consideration. For example, determining the scaling factor in a preferred embodiment comprises determining a ratio of the distance of a marked point in the second editing area from the center line (profile line) to the distance of a corresponding marked point in the first editing area. Such marked points may be the corner of the mouth facing toward the viewer and the corner of the mouth averted from the viewer (as the corresponding marked point) in the graphical representation of the partial profile view. Alternatively or in addition, the pupils can also be used as marked points. The use of such marked points is advantageous in so far as their detection and evaluation can automatically be performed in a very reliable way. The scaling factor used here can solely be based on a determined distance ratio or on an average value of different distance ratios of various marked points. It is also possible, however, to correct a value deposited in the database depending on one or more determined distance ratios and to use this corrected value as the scaling factor.

In many cases, an eye-witness's perception comprises not only one, but considerably more perspectives. In order to benefit from this fact in the construction of a facial composite, the method preferably comprises activating a 3D editing mode in which during the acquisition of user inputs for selecting and/or for positioning and/or orienting and/or dimensioning first image data elements, the first display area and the second display area are represented graphically at the same time The user/witness can perform a control and/or correction of a selection and/or position and/or orientation and/or dimension of the representations of image data elements in two perspectives in parallel at the same time, so to speak. To this end, the method preferably comprises acquiring a user input for positioning and/or orienting and/or dimensioning the representation of the second image data element of the second part of the face in the second display area relative to the representation of the second image data element of the first part of the face in the second display area; and adapting the position or orientation or dimension of the representation of the corresponding first image data element of the second part of the face in the first display area relative to the representation of the first image data element of the first part of the face in the first display area depending on the acquired user input for positioning and/or orienting and/or dimensioning in the second display area.

In a preferred embodiment, at least one of the first and second perspectives represents a partial profile view, and the other of the first and second perspectives represents a front view. Here, the method particularly preferably comprises determining a first editing area of the partial profile view (i.e. a first editing area of the display area that represents the partial profile view), which represents a first side of the face in the partial profile view, and a corresponding first editing area of the front view, which represents the first side of the face in the front view. This first side of the face can be the side of the face that faces toward or away from the viewer in the partial profile view. Thus, the represented face is in particular divided into two editing areas along a center line (profile line) of the face in both perspectives. Due to the different perspective, the first editing areas in the two display area have different sizes.

In this preferred embodiment, the method further comprises determining a first scaling factor which in distinction to further (also above) described scaling factors of preferred embodiments can also be referred to as a first partial profile-front scaling factor, since it associates the first editing areas of the partial profile view and the front view with each other. The determination of the first partial profile-front scaling factor can be performed in various ways. In a preferred embodiment, this scaling factor is deposited in the database and is retrieved from the database for the preferably simultaneous editing of the partial, profile and front views of the facial composite. Alternatively, as described above in connection with the partial profile-partial profile scaling factor, the first partial profile-front scaling factor is at least partially determined from a ratio of the distances of marked points from the center line each in the first editing area of the front view and of the partial profile view.

Moreover, the method preferably comprises acquiring a user input for graphically editing the representation in the first editing area of the partial profile view or the front view (i.e. in the first editing area of the first or second display area), which comprises shifting at least one pixel of the representation in the first editing area of the corresponding view and/or a primary editing tool represented in the first editing area of the corresponding view by a primary position change stipulated by the user input, which includes a primary horizontal and/or a primary vertical component of the position change. Thereby, the user can change areas of the image in the first editing area of one of the represented views individually. For example, the user can individually adapt the position of an eye or the distance of the eye to the center line of the face and/or the width of a nostril and/or width and/or shape of the mouth in one of the two editing areas directly. This editing can be performed in accordance with the above-described editing of a partial profile view.

Preferably, a corresponding image area in the other perspective is simultaneously changed as well in order to leave the impression of perspective consistency between the two perspectives unaffected, without the user having to make this adaptation separately. For example, the method particularly comprises simultaneously shifting at least one pixel of the representation in the first editing area of the correspondingly other perspective (i.e. front view of partial profile view) or a secondary editing tool represented in the first editing area of this other perspective by a secondary position change determined depending on the user input and the first partial profile-front scaling factor, which includes a secondary horizontal and/or a secondary vertical component such that the secondary horizontal component corresponds to the primary horizontal component scaled by the first scaling factor and the secondary vertical component corresponds to the primary vertical component. The adaptation by means of the secondary editing tool does not necessarily have to be simultaneous or be displayed simultaneously. Instead, only one perspective may be edited and/or displayed in a 2D editing mode at first, for example, wherein the automatic transfer of the changes to the other perspective is not performed and/or displayed until the combined editing tool or a 3D editing mode is activated.

As described in connection with editing of the partial profile view, the virtual editing tool comprises, in addition to a primary editing tool, which directly acts on the editing area edited by the user by means of the primary editing tool, a secondary editing tool acting on the other (complementary) editing area (i.e. the other perspective). The position of the secondary editing tool and the position of the graphical elements (e.g. pixels) edited therewith is changed simultaneously with the primary editing tool, but scaled with respect to its movement. Here, the vertical movement of both editing tools is the same. The horizontal component, however, is scaled by the partial profile-front scaling factor. For example, if the user directly edits the side of the face averted from the viewer as the first editing area of the partial profile view, then the secondary horizontal component is obtained from the primary horizontal component by multiplication with the scaling factor, for example, which results in a corresponding increase of the horizontal extension of the editing effect in the front view. The same applies to the primary editing of other sides of the face and a determined increased or reduced transfer to the other perspective. In this case as well does the conversion by means of a scaling factor represent an anatomical approximation. It turned out, however, that an unexpectedly good acceptance by eye-witnesses is achieved in a very easy way within the scope of construction of facial composites.

In a further preferred embodiment, the for the first editing areas of the partial profile view and the front view can analogously be applied as an alternative or in addition to the other side of the face, i.e. to second editing areas of the partial profile view and the front view as well, wherein a second partial profile-front scaling factor is applied here. Preferably, the product of the first and second partial profile-front scaling factors yields the partial profile-partial profile scaling factor described above.

Preferably, the image database is provided such that it comprises a plurality of image area data sets, each of which comprises a plurality of image data elements such that image data elements included in different image area data sets represent different parts of the face of human faces, while different image data elements within one image area data set represent substantially the same part of the face of different human faces.

Preferably, the database is provided such that for each first image data element it comprises a corresponding third image data element, such that the third image data element represents at least partially the same part of the face of the same human face in a third view/perspective, wherein the method comprises determining the corresponding third image data elements corresponding to the selected first image data elements. In a particularly preferred embodiment, the method in this case comprises graphically representing the determined third image data elements in a third display area of the graphical user interface. Particularly preferably, the adaptation of the position and/or orientation and/or dimension of the representation of the third image data elements in the third display area is performed by analogy with the first or second display areas depending on corresponding user inputs. Here, the third display area can be represented either alternatively or in addition to the first and/or second display area(s). In a further preferred embodiment, the third display area is not represented directly. Instead, after completion of the facial composite on the basis of the first and/or second display area(s), the third image data elements primarily serve to construct a three-dimensional model of the offender image.

Preferably, the image database is provided such that the first and/or second and/or third view(s)/perspective(s) comprise a front view and/or a profile view and/or a half-profile view of the respective human face. For example, the first perspective could represent a front view, the second perspective a profile view, and the third perspective a half-profile view. However, any other or interchanged association would be possible as well, in particular an interchange of the rolls of the first and second perspectives.

Preferably, the method further comprises constructing a 3D model (three-dimensional model) of a human face from the selected first image data elements and the determined corresponding second and/or third image data elements. Due to the anatomical correspondence of the image data elements in the various perspectives, construction or simulation or calculation (also referred to as rendering) of a three-dimensional model at a later time is very possible. Particularly preferably, the human face three-dimensionally modeled in this way is graphically represented in a further perspective different from the first and second perspectives. It is thus possible to represent the offender image in various perspectives. Thereby, one gets all the advantages of a fully three-dimensional facial composite without being confronted with the problems of a three-dimensional representation during the construction of the facial composite.

Preferably, providing the image database comprises a method of creating an image database according to a further aspect of the invention. In one aspect, the invention provides a computer-implemented method of creating or expanding an image database for facial composites. Here, the method comprises creating a first photographic picture of a human face in a first view/perspective and creating a second photographic picture of the human face in a second view/perspective.

Moreover, the method comprises generating a plurality of first image data elements from the first photographic picture and a plurality of second image data elements from the second photographic picture, wherein the generated image data elements each represent a part of the face of the human face such that for each first image data element a corresponding second image data element exists, which represents at least partially the same part of the face of the human face.

Hence, the method particularly comprises dividing the first and second photographic pictures into a plurality of image areas according to a predetermined scheme such that for each first image area of the first photographic picture a corresponding second image area of the second photographic picture exists, which represents at least partially the same part of the face of the human face as the first image area. Here, preferably no part of the human face is represented on two first or two second image data elements, i.e. the parts of the human face represented by the image data elements do preferably not intersect. Particularly preferably, the parts of the face comprise an eye area and/or an ear area and/or a nose area and/or a mouth area and/or the hair.

Particularly preferably, generating the plurality of image data elements from the corresponding picture comprises cutting out a plurality of parts of the face and graphically editing the cutouts, wherein editing particularly comprises smoothing edges. This means for example that particularly the color intensity and/or the contrast in the representation of the corresponding part of the face decrease toward the edge of the cutout—for example in the outermost 0.5 to 5 millimeters of the respective image part in the original size of the human face—or that in this area a transparency of the pictorial representation increasing toward the edge of the cutout is added. Thereby, when the respective image data element is inserted into a later facial composite, a continuous transition toward a background and/or toward adjacent image data elements can be achieved.

The method further comprises storing the plurality of first and second image data elements such that each first image data element is uniquely assigned the corresponding second image data element in the database. Such assignment can e.g. be achieved by means of corresponding file names of the image data elements or in another way by a suitable arrangement or indexation.

In particular for creation of the database from the beginning—i.e. if no image data elements had been stored before— the method steps are performed for a plurality of human faces, wherein (for all faces) the same first and the same second perspectives are used. Particularly, the capturing directions match for the plurality of first photographic pictures of the various human faces. The same applies to the plurality of second photographic pictures. One thereby obtains a very comprehensive set of image data in the form of very flexibly combinable image data elements, wherein, for each image data element in a view, the corresponding image data element in the second view is available, and the parallel construction of a facial composite in the second perspective is easily possible in a consistent way.

Preferably, creating first and second photographic pictures and generating first and second image data elements is each performed for a plurality of human faces on the basis of corresponding parts of the face, wherein for each part of the face the image data elements of the plurality of faces are stored in a corresponding image area data set such that the image data elements are not arranged or indexed in the same order of the plurality of photographic pictures in all image area data sets.

Preferably, the method comprises arranging or storing or indexing the first or second image data elements within at least one, preferably within each image area data set in a random order, preferably using a random generator, wherein the random order differs between different image area data sets. Preferably, the assignment of the individual image data elements to the original photographic pictures is not stored. Thus, it is not directly and clearly possible any more to reconstruct the original photographic pictures. The photographic pictures themselves are preferably deleted or destroyed. Thereby, it is possible to use real source material on the basis of living persons for the pictorial representation and at the same time comply with stringent data protection criteria, wherein the database structure alone does not allow drawing conclusions on the actual looks of the living persons who originally were available for the pictorial source material.

The assignment between corresponding image data elements is always maintained, so that the anatomically consistent representation of the parts of the face in the two different perspectives is always maintained for any arbitrary composition of different image data elements from various human faces of the source material.

Preferably, creating first and second photographic pictures and generating first and second image data elements is each performed for a plurality of human faces on the basis of corresponding parts of the face, wherein, for each first photographic picture, the method further comprises randomly selecting at least one part of the face for which no first and second image data elements are generated or at least stored. In this way, it is not possible to fully reconstruct any of the original photographic pictures constituting the pictorial source material in the construction of image databases on the basis of living persons, which contributes to special security with respect to data protection.

Preferably, for each first photographic picture, the method comprises creating a third photographic picture of the human face in a third view/perspective; generating a plurality of third image data elements from the third photographic picture such that for each first image data element a corresponding third image data element exists, which represents at least partially the same part of the face of the human face; and storing the plurality of third image data elements such that each first image data element is uniquely assigned the corresponding third image data element in the database.

In a further aspect, the invention provides a computer system for constructing facial composites, comprising:
an image database comprising a plurality of first image data elements, each first image data element representing a part of the face of a human face in a first view/perspective, and wherein for every first image data element the image database comprises a corresponding second image data element such that the second image data element represents at least partially the same part of the face of the same human face in a second view/perspective;
an input interface adapted to
acquire a user input for selection of a first image data element of a first part of the face of a human face, i.e. an image data element representing a first part of the face of a human face in the first perspective;
and acquire a user input for selection of a first image data element of a second part of the face of a human face, i.e. an image data element representing a second part of the face of a human face in the first perspective;
a data processing device for determining the corresponding second image data elements corresponding to the selected first image data elements; and
a graphical output interface adapted to
graphically illustrate the first image data elements selected by the acquired user input in a first display area; and
graphically illustrate the determined second image data elements in a second display area of the graphical user interface.

Preferably, the computer system is adapted to execute a method of constructing facial composites, in particular in one of the described preferred embodiments, according to the invention.

In a further aspect, the invention relates to a computer system adapted to execute a method of creating an image database for facial composites, in particular in one of the described preferred embodiments, according to the invention.

Moreover, the invention provides a computer program product, in particular configured in form of a machine-readable medium, as a signal and/or as a data stream, which comprises machine-readable program code which, when loaded on a computer, causes the execution of or is adapted to execute a method according to the present invention in one or more of the described embodiments.

Figure 4:
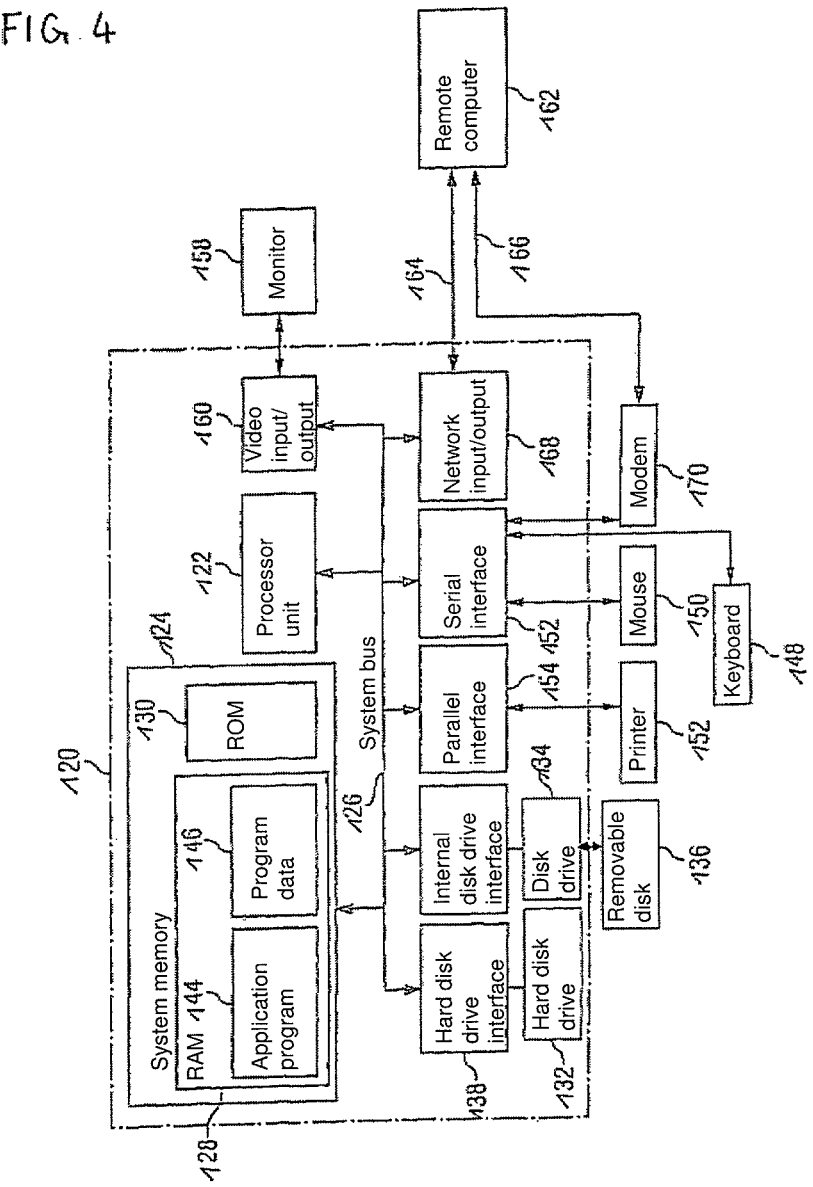

The invention will be described in the following on the basis of preferred embodiments with reference to the accompanying drawings, which show:

FIG. 1 a schematic representation for illustrating a method of constructing a facial composite according to a preferred embodiment of the invention;

FIG. 2 a schematic representation for illustrating a method of creating an image database according to a preferred embodiment of the invention; and FIGS. 3A-D exemplary representations of display areas for illustrating a method of constructing a facial composite according to a preferred embodiment, with an individual editing of the graphical representations of image data elements;

FIG. 4 a schematic representation of an exemplary system for implementing the invention.

FIG. 1 illustrates schematically some aspects of the sequence of a computer-implemented method of construction facial composites according to a preferred embodiment of the invention. Moreover, a database structure for the construction of facial composites according to a preferred embodiment can at least partially schematically be seen therefrom.

First of all, an image database 10 comprising a plurality of image area data sets (12a, 12b, ... 12e) is provided. Each of these image area data sets (12a, 12b, ... 12e) corresponds to a specific part of the face of a human face and includes a plurality of corresponding image data elements that represent the corresponding part of the face for a plurality of human faces from different perspectives (two in the case of FIG. 1). For example, a first image area data set 12a represents haircuts or human hair, a second image area data set 12b eyes, a third image area data set 12c ears, a fourth image area data set 12d noses, a fifth image area data set 12e mouths. In the shown embodiment, the image database 10 further comprises an image area data set 12f, the image data elements of which represent clothing, for example.

Depending on the desired file variety and flexibility in the construction of facial composites, the image database could comprise only some of the mentioned image area data sets and/or combinations of the mentioned image area data sets and/or other or further image area data sets (e.g. for eyebrows, chin areas, beards, etc.).

The image database 10 provided according to FIG. 1 is intended for two different perspectives, i.e. a front view (or frontal view) and a profile view (lateral view). Accordingly, the image database 10 includes corresponding pairs of image data elements for front and profile views each. In the list of elements in the image database 10 shown in FIG. 1, the corresponding pairs in the individual image area data sets (12a, ... 12f) are numbered in their designation (1, 2, 3, ... ), designated with a specific letter depending on the individual image area data sets to which they belong ("h" for hair, "a" for eyes, etc.), and marked with "F" for front view and "P" for profile view depending on the perspective. This notation can preferably be part of respective file names in order to code the assignment of the image data elements with respect to each other and/or to the respective image area data sets or parts of the face and/or to the respective perspectives.

Thus, the image database 10 is basically composed of at least two sub-databases 14, 16. Here, the first sub-database 14 comprises a plurality of first image data elements (Fh1, Fh2, ... Fa1, Fa2, ... ), which respectively represent a part of the face (hair, eyes, ears, nose, ... ) of a human face in a first perspective (the front view in the illustrated example), whereas the second sub-database 16 represents the respective corresponding image data elements (Ph1, Ph2, ... Pa1, Pa2, ... ) in a second perspective (in the profile view in the illustrated example). In FIG. 1, the image data elements in the sub-databases 14, 16 are therefore drawn in without the addition "F" or "P". The individual image data elements of each corresponding pair of image data elements are uniquely assigned to each other e.g. via the corresponding file name (as mentioned above) or the index or the corresponding position in the sub-databases 14, 16 or via a corresponding link table in the image database 10. By analogy with the image database 10, the sub-databases 14, 16 are divided into corresponding image area data sets (18a, 18b, ... 18f) and (20a, 20b, ... 20f), respectively, each of which corresponds to the corresponding part of the face.

To construct a facial composite, a user preferably at first selects a part of the face or the corresponding image area data set by means of a user interface in order to select an image data element for display in a first display area 22 from the list of image data elements of this image area data set. For example, at first the first image area data set 18a of the first sub-database 14 could be activated to display the list (h1, h2, h2, ... ) of available image data elements to the user, said image data elements representing different haircuts. Subsequently, a user input for selecting a first image data element 26a of the first part of the face, i.e. the hair, is acquired. This first image data element 26a of the first part of the face, which is indexed with "h35" in the example of FIG. 1, is graphically represented in the first display area 22 of a graphical user interface. Thus, the selected hair is shown in the front view in the display area 22.

Preferably, a further image area data set 18b of the first sub-database 14 is activated afterward to display a list (a1, a2, a3, ... ) of available image data elements for selection, which in the example of FIG. 1 represent different eyes. Subsequently, a user input for selection of a first image data element 26b of the second part of the face, i.e. the eyes, is acquired. This first image data element 26b of the second part of the face (i.e. of the second image area data set 18b), which in the example of FIG. 1 is indexed with "a23", is graphically represented in the first display area 22 of a graphical user interface together with the first image data element of the first part of the face. Thus, the selected hair and the selected eyes are show in a front view in the display area 22.

Preferably, the method comprises acquiring a user input for positioning and/or orienting and/or dimensioning the representation of the first image data element "a23" of the second part of the face in the first display area 22 relative to the representation of the first image data element "h35" of the first part of the face in the display area 22. For example, the user can change the position and/or orientation and/or shape and/or size of the eyes relative to the hair in the first display area by means of a computer mouse, for example.

Depending on the selection of the first image data elements 26a, ... 26f, the corresponding image data elements 28a ... 28f are preferably automatically determined from the second sub-database 16 and—optionally depending on a positioning and/or orienting and/or dimensioning made by a user in the first display area 22—are represented in a second display area 24.

In order to configure the image database 10 as a combination database in the described form, individual elements are preferably taken from a respective source material (front and profile pictures of persons), which are stored in a front database (first sub-database 14) and a profile database (second sub-database 16), respectively. These elements for the same parts of the face (e.g. haircuts or eyes or ears or noses or mouths or clothing) are preferably stored at the same file level, i.e. in the same image area data set.

FIG. 2 shows a schematic representation for illustrating a method of creating an image database (10) according to a preferred embodiment of the invention. The same reference numerals as in FIG. 1 are used for similar components. Thus, for details about these components, reference is made to the corresponding description of FIG. 1.

The source material is a first photographic picture 30 of a real person in the front view and a second photographic picture 32 of the same real person in the profile view. These photographic pictures are divided into individual parts of the face and respective first image data elements 26a, 26c, ... 26f as well as the corresponding second image data elements 28a, 28c, ... 28f are generated. The image data elements are stored in the corresponding image area data sets 18, 20, i.e. the corresponding file level, of the respective sub-database (front database 14 or profile database 16) according to the respective part of the face.

Within the respective file level and the respective sub-database, the corresponding image data elements are preferably given the same position and/or the same numbering. They are referenced relative to each other so to speak. Each haircut or each pair of eyes is to be considered a file element. Due to the same designation and position within the file level, these file elements 26a, 28a, which are first to be considered to be separate, become so-called combination elements [26a+28a] (exemplarily designated with "h5" in FIG. 2), which from now on are associated with each other such that based on the one element, the respective counterpart can immediately be recalled as well. Thus, both file elements represent the same content, i.e. substantially the same part of the face, from different views (perspectives). The information of both perspectives is not only combined due to this database structure, but also optically in view of the later use within the scope of construction of the facial composite.

From these combination elements, the so-called combination database or image database 10 forms afterward, which now comprises the entire image information of both databases.

These combination elements can now be used separately for constructing a facial composite either from the front perspective or the profile perspective by means of the display areas 22 or 24, for example. It is irrelevant here which of the two perspectives is started with.

Since the element used or the respectively selected element (image data element) establishes a direct connection to the element of the respectively other original sub-database 14 or 16 via its designation and position, which in addition has been obtained from the same or corresponding source material (two views of the same person), there is nevertheless absolute geometrical or anatomical consistency in spite of the other perspective. These features of the combination element bring about that forming of a perspective always means that the respectively other perspective is formed as well. A separate formation of the other perspective representation, in which the database has to be looked through again, can thus be omitted. Therefore, despite the final representation and availability of two perspectives, only one perspective has to be effectively constructed and edited. The other perspective is preferably adapted only in order to be able to take the individual adaptations by a witness into account in this representation as well.

Preferably, the position or referencing of the combination elements of both previously created sub-databases 14, 16 within the combination database 10 is identical, which in the case of a content representation of the combination database brings about that the respective combination element can always be represented together with its partner element (the corresponding element).

According to FIG. 1, for example, the designation of a combination element in the area of the haircut level reads: Ff35Pf35 (Ff=front haircut, Pf=profile haircut, haircut no. 35). Accordingly, a complete facial composite according to FIG. 1 could be represented as follows with respect to the structure of the combination database 10 and the combination elements taken therefrom:

Ff35Pf35Fa23Pa23Fo14Po14Fn11Pn11Fm8Pm8Fk19Pk19

(Fa/Pa=front eyes/profile eyes, Fo/Po=front ears/profile ears, Fn/Pn=front nose/profile nose, Fm/Pm=front mouth/profile mouth, Fk/Pk=front clothing/profile clothing). Here, the numbers preferably designate the exact position within the corresponding file level, i.e. the respective image area data set.

This results in a kind of code that can be added to any image output as a file in the area of the image information, whereby it is also clear afterward which combination elements were used in the construction. Moreover, the image information can only be understood by the user of the combination database 10, since he is the only one to access the combination elements behind the respective designation. The above-indicated code of the complete image could be abbreviated as follows:

FP/35/23/14/11/8/19.

This is subject to the condition that the order of the combination elements used in the image database 10 is left unchanged. Now, further abbreviations can be added to this coding. A further example would be the data of the construction, the abbreviation of the department, as well as the match of the constructed image with the wanted person as estimated by the witness:

FP/35/23/14/11/8/19-22122010-TRK5-80.

(Preferably, TR means Trier, K5 the local criminal investigation department 5, and 80 for the 80% match with the wanted person as estimated by the witness.)

Even many months later it can still be seen whether in the corresponding case a combined or an individual front or profile facial composite was constructed. An individual front or profile image would be designated with "F" or "P" at the beginning, instead of "FP" for a combined image. In particular, this coding increases data protection, as will be explained in more detail later on.

What is basically made here is identical referencing of two sub-databases, which are based on the same source material but have different orientations (perspectives), whereby the combination database 10 is formed taking all individual elements together, all image information being combined in the combination database 10 without cancelling out the independent character and content of this information. The combination database 10 thus contains mutually referenced image information of different orientations (perspectives) which come from the same image source (the same real person), which be used both in combination and individually.

Here, the combination database 10 can be used in completely different ways. On the one hand, it is possible that a facial composite be constructed in the front view only by means of the first output area 22, if the witness observed only this perspective. The same applies to the construction in profile e.g. on the basis of the second output area 24. In addition, there is the presented possibility of a combined construction, i.e. the creation of a combined facial composite, which can represent both perspectives if the witness observed them correspondingly. Due to the special database structure, this can also be done in parallel by editing both views within an image editing application at the same time, e.g. next to each other or one on top of the other.

Hence, the user of the combination database is not forced to resort to other database structures. The combination database 10 can still be used in a flexible way. In spite of its combined structure, it still offers the possibility to construct individual images in the area of the individual perspective. In the field of facial composite construction, the use of a combination database provides a very efficient possibility to construct such an image in two perspectives at the same time. A use of two content-separated databases would not only bring about that the witness had to face another complex selection procedure, but would also not lead to an optically corresponding or anatomically consistent result, which in the end could question the credibility of both representations.

It should also be noted that the content of the profile database is preferably mirrored in addition in order to make use of the possibilities of the combination database also with respect to the other (e.g. left) side of the face.

Due to this functionality, there result very useful possibilities in the representation of faces within the scope of construction of facial composites. Preferably, the combination database contents to be used independently of each other offer the possibility of a so-called forecast function. It can particularly be applied in cases where the witness only observed one of the two perspectives. Here, for constructing the facial composite, at first only the part of the combination database that corresponds to the perspective actually perceived by the witness is used. Subsequently, the respectively other, i.e. corresponding part of the combination database is used, the combination elements of which are identical with the combination elements selected by the witness due to the special structure of the database.

When selecting the combination elements, the witness already selects the associated elements of the other perspective as well, so that the facial composite can also be represented in the other perspective not observed by the witness. This additional representation not observed by the witness is considered to be a forecast and thus provides very helpful possibilities in the representation of wanted persons.

Moreover, the construction of a front and profile image of a person resulting from the use of the combination database is also suitable for computing a three-dimensional object, whereby the representation possibilities of a facial composite are preferably expanded to any conceivable observation angle in a very efficient way and with high reliability. Further, the three-dimensional object computed from both views serves to represent observation perspectives alternatively perceived by the witness and to simulate the observation conditions, such as light conditions or facial expression.

The witness is thereby given a very practical possibility of comprehensively assessing the facial composite with respect to all aspects of the observation. This optimizes not only the consideration of all parameters for the facial composite construction, but the wanted person could also be represented in the most expressive perspective. Preferably, by representing additional perspectives, one can also make corrections to the two-dimensional facial composites. The construction process of the image additionally has the effect that the witness is not unable to cope with the work on a three-dimensional object.

A further advantageous application of the invention as part of the visual tracing of persons results from the so-called offender photo reconstruction. Here, with the help of the combination database, the image of an offender, which can only be seen in the sequence of a surveillance film and which is not or with insufficient quality available and thus cannot be used for the purposes of tracing wanted persons or for automated comparison systems, can be reconstructed.

Preferably, the offender photo reconstruction starts with the selection of suitable sequences from the available video material. Sequences that are suitable are those which can be compared to the respective combination elements of the combination database. If the person can be seen in the front and profile views, the combination database can be used preferably to the fullest according to the described preferred embodiments, specifically as far as the front and profile views are deposited in corresponding sub-databases as well.

After the most similar elements of a perspective have been selected, they can be individually adapted to the look of a person that can be seen in the sequences. Due to the functionality of the combination database, the person can be reconstructed from at least two different perspectives now. A further adaptation particularly of relative positions and/or orientations and/or dimensions of individual image data elements guarantees a best possible match with the original in the film or image sequence.

Each perspective can finally be assessed again with respect to the corresponding sequences of the surveillance material. Since both images are related to each other by the combination database, any correction to a perspective can easily be applied to the respectively other perspective as well, which will be described in more detail below on the basis of further preferred embodiments of the present invention. The possibility of reconstructing the look of a person from two perspectives increases the reliability of such an offender photo reconstruction.

Given that video material has often not at all or only to a limited extent been used for the investigations, the offender photograph reconstruction by means of the present invention represents huge progress, since now it is possible to use two views of the person on the image material for tracing that person. In order to achieve this with an original image detail of the available material, at least one sequence is required in which the person can be seen sufficiently good, with respect to all facial features, at a particular moment. The sum of all sequences seen in the entire material is sufficient for the offender photograph reconstruction. The respective moment only has to be optimal for one facial feature, and not for the entire face.

Since two anatomically consistent views of the same person are available, all image information that can efficiently be used for computing a three-dimensional representation is available now. The three-dimensional representation has the advantage of representing the image of the wanted person comprehensively and at any angle. When the three-dimensional object is computed, it can be positioned in parallel with the available image sequences, which allows a comparison between the exact position of the head within the sequence and the matching of the three-dimensional object with the sequence in an optimum way. Moreover, a three-dimensional object can represent even more information than the representation of two perspectives, which improves the public tracing of wanted persons significantly.

It is also conceivable to use such reconstructions also for the search with face recognition systems, which would not have been possible yet, or at least not with the same efficiency, on the basis of the material seen in the surveillance film sequences. By means of the offender photograph reconstruction on the basis of the present invention, it can be avoided that film or image material of an offender, which due to its quality is not suitable for publication or a comparison within the scope of face recognition, is not used any more even if it contains all image information sufficient for a useful reconstruction of the wanted person.

In a preferred embodiment of the method of creating an image database for facial composites according to the invention, a high degree of security with respect to data protection can be achieved. Preferably, it is ensured that none of the used photographic pictures of real persons can be assembled again at a later time.

A photograph, i.e. specifically one of the photographic pictures 30, 32, could possibly be reconstructed at a later time if the exact storage location of the used and stored image elements within the created database was known. In particular in the case of the combination database 10, the possibility of a reconstruction is not desired, since here both the front view and the profile view of a real existing person could be assembled to form a complete image again at a later time.

In a preferred embodiment, the invention solves this additional problem by never selecting and storing all image elements from a photographic picture 30, 32, the individual image elements of which are used for databank construction, despite the suitability thereof. Instead, one deliberately leaves a gap so that this photograph, i.e. the photographic picture 30, 32, can never come up completely in its parts. Even if someone knew the exact storage location of the image elements of a specific person within the database, it would not be possible to assemble the complete photograph of a person again at a later time. This is illustrated in FIG. 2, where at least one image element or image data elements 26b', 28b' or a corresponding part of the face is selected preferably by means of a random generator. This image data element 26b', 28b' is not stored.

In a further preferred embodiment, it is ensured that the position of the individual image elements within the database is such that the used image elements (image data element) of a specific person cannot be assembled any more due to a position within the image database. In particular, the exact positioning of the image elements used by a photograph within the respective file level (image area data sets) is not performed using consecutive numbering. Preferably, all image elements receive a random number within their file level. In this way, it is ensured that the originally associated image data elements in the combination database cannot be associated again via the same number.

This procedure in combination with the deliberate placement of gaps within the respective database makes it impossible to assemble an original image used in the construction of the database again at a later time.

In a preferred embodiment of a method of constructing facial composites according to the invention, it is possible to individually adapt the position and/or orientation and/or dimension of the representation of all first and/or second and/or optionally further image data elements of preferably all parts of the face in the respective display area preferably at any time during the construction of a facial composite and/or also afterward. This is preferably ensured by a combined editing function, which is preferably activated together with a 3D editing mode of a preferred embodiment of the present invention and preferably allows a simultaneous adaptation particularly of all supported and displayed perspectives. To this end, preferably the position and/or orientation and/or dimension of the representation or of sub-areas or parts of the representation of an area of a face, i.e. corresponding image data elements, are associated with each other in the various display areas. This association of the representations of different perspectives will be described in more detail below on the basis of preferred embodiments.

Thanks to this adaptation technique, the user of a method or system is not restricted to only those parts of the face (i.e. image data elements) that are provided in the database. Instead, based on a default from the database, the user can perform a further individual adaptation of details (e.g. position, orientation and/or dimension) of the representations in order to adapt the result even more precisely to the witness's description of the offender e.g. based on editing in one perspective. Thereby, the database itself does not have to be so extensive as to cover the finest gradations in the details of the parts of the face. For example, different nose widths, lengths, or inclinations in coarser gradations can be sufficient to represent also intermediate values by individual editing by means of corresponding user inputs.

Altogether, in spite of a relatively small database, a high degree of individualization can be ensured to visualize the witness's memory in the best possible and most effective way, wherein due to the association of the different perspectives the amount of work involved in the construction of a facial composite can be kept small on the one hand, and the perspective consistency of the representations in the different perspectives is substantially maintained on the other hand. A particular advantage obtained thereby is the high degree of individualization, which is already obtained by means of two-dimensional representations.

The time issue with respect to the witness's ability to concentrate is efficiently solved by the described facial composite database. For example, the construction of a facial composite and the visualization of several perspectives and their individual adaptation take e.g. 90 minutes, which is a considerable advantage over other possible approaches. For example, the process of selecting the image data elements can be completed after less than one hour. The remaining time may be needed for individualization by a corresponding editing particularly with respect to position, orientation and/or dimension of the representations of the individual image data elements. Here, the witness is asked only once for the required information due to a particularly automatically synchronized adaptation of different perspectives. Here, the witness is not even forced to decide on one perspective during the adaptation. With respect to the different perspectives and the contents presented therein, the witness can switch between the views during editing. Thereby, the witness is effectively asked for the information. There is no reason to fear that the witness could be irritated, since the changes preferably take place simultaneously.

Although several perspectives are shown, the witness invests as much time and effort as if he was working on only one perspective. A particular improvement achieved by the invention is not only ergonomics. An even more crucial effect is that the facial composite representation can take place within a specific period of time and that the witness is physically and mentally able to cope with the amount of time involved or the extent of content to be dealt with. Thus, the described facial composite construction results in a significant improvement of the expressiveness and recognition value of facial composites. In many conventional methods, there was a significant amount of useless and unreliable results, which was not least because the witness was overstretched.

In a preferred embodiment, the method or a corresponding computer system comprises an aging function designed to adapt the age of a represented person individually according to the wishes of the witness ("aging"). Thus, it is not necessary to provide any possible age representation for the most varied database elements in the database.

FIGS. 3A-D illustrates a further functionality according to a preferred embodiment of the invention. In particular, in preferred embodiments, a combined editing tool is provided, which particularly associates different perspectives with each other and particularly allows simultaneous and perspectively consistent editing of the graphical representations.

By means of the combined editing tool according to a preferred embodiment, for example both sides of the face and/or different perspectives (i.e. the graphical representations in different display areas) can be edited preferably simultaneously. For example, the distance between the eyes and/or the width of the nostrils and/or a lateral protrusion of the ears and/or a position and/or line/shape of the corners of the mouth and/or the width/volume of the lips, etc. is/are adapted individually.

In a preferred embodiment, mirror symmetry of the face is assumed. If individual changes are made in one side of the face, the same changes are to be applied on the other side of the face as well—in a mirrored fashion—in the case of symmetry of the face. As far as a display area shows the face in a symmetrical perspective, particularly in a front view (e.g. FIG. 3A), a corresponding editing tool can simply be mirrored on a center line (profile line) 40 of the representation of the face and corresponding editing can take place simultaneously on both sides of the face A1 and A2. An exact front view exhibits a high degree of symmetry. Thus, the representation of the face can easily be divided into two equally-sized halves in an automated way, which are separated from each other by the center line 40. Basically, for example in the case of corrections of the nostrils, it would be sufficient here to work with a mirrored tool, which starting from the center line 40 of the face is used at the same intervals. Preferably, a first editing area 42 and a second editing area 44 of the selected perspective are edited simultaneously.

Figure 3A:
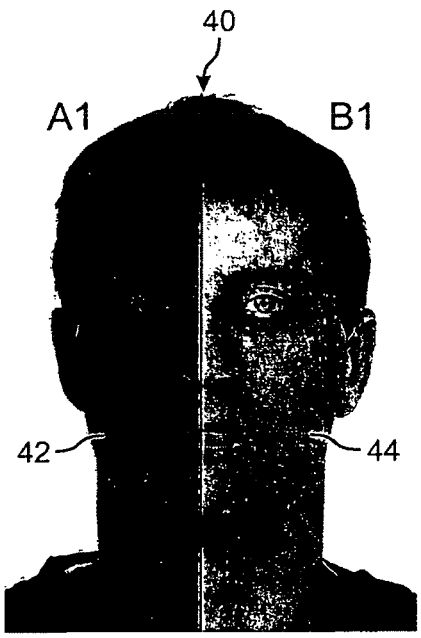
Figure 3B:
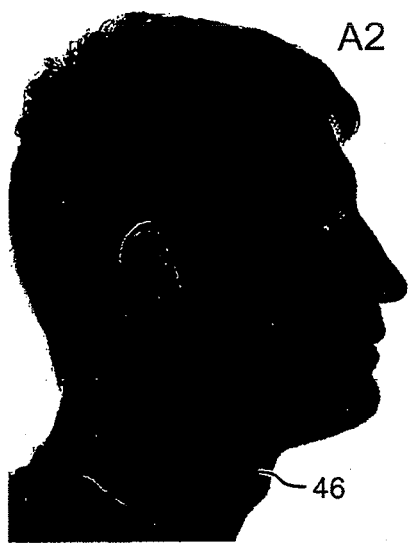

In a preferred embodiment, this first perspective is graphically displayed as a front view in a first display area, whereas a second perspective is represented as a profile view in a second display area (e.g. FIG. 3B). Particularly preferably, the side of the face represented there (the right side of the face A2 in FIG. 3B) can be coupled with the corresponding side of the face A1 of the first perspective by means of the combined editing tool such that graphical adaptions in the first perspective of the side of the face A1 can be applied to the second perspective of this side of the face A2. In particular, vertical components of shifts of individual pixels and/or parts of image data elements or of whole image data elements are also be adopted as corresponding changes of the vertical position(s) in the corresponding elements of the second perspective. The same applies to direct editing of the two perspectives, the vertical components of which being adopted in the first perspective A1. Here, the horizontal components preferably remain mutually disregarded. For example, a slight correction of the width of the nose does not affect the profile view.

However, if the representation of the two sides of the face is not symmetrical, since e.g. the representation or viewing direction is not in the plane of symmetry of the face (e.g. FIG. 3C), an editing tool cannot be mirrored just like that. In a preferred embodiment, the invention nevertheless provides a simple but surprisingly efficient possibility to allow fast editing of both sides of the face e.g. in a partial profile view as well, without negatively influencing the perspective impression of symmetry of the face.

Figure 3C:
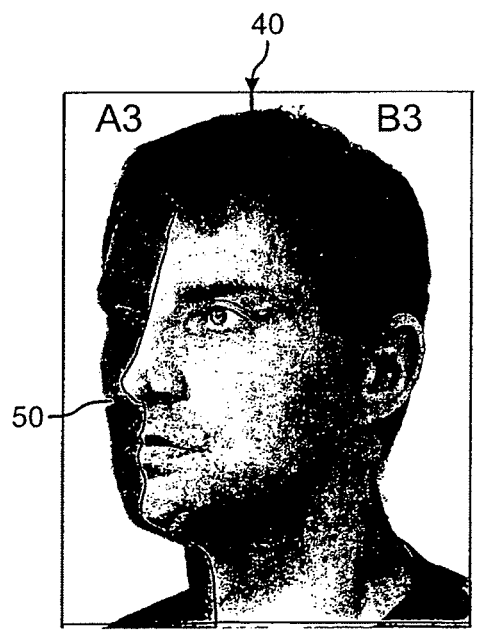
Figure 3D:

Thus, in a preferred embodiment, at least one display area of the graphical user interface represents a partial profile view, as can be exemplarily seen in FIG. 3C. Particularly preferably, the viewing angle does not deviate from the front view by more than 45° (semiprofile). In the partial profile view of FIG. 3C, details of the averted side of the face are hidden. Parts of the mouth, eyes, and haircut are not visible any more. Now, if one tried to transfer details of a front representation to the partial profile (e.g. semiprofile), it would probably not be ensured any more—without a corresponding function for the correct transfer of this data—that the representations of both views after this adaptation match. The form of the changes would have to be assessed by the user without any auxiliary tools, which leads to inaccuracy preventing a matching representation.

With the combined editing tool according to a preferred embodiment of the invention, it is achieved that symmetry properties of the face and/or the consistency of different perspectives are automatically taken into account with surprisingly perspective accuracy in a very simple and efficient way.

In the case of a semiprofile, the representation even of a symmetrical face exhibits asymmetry, because it is turned to a specific side. On the side facing away from the viewer, the space taken up by the parts of the face is reduced, while it is pulled on the side facing toward the viewer, i.e. takes up more space. To nevertheless achieve an automatic and perspectively correct adaptation of the representation of symmetry properties of the face, preferably the degree of deviation of the semiprofile with respect to the front representation is determined. An exact semiprofile preferably shows one third of the averted side and two thirds of the side facing toward the viewer. This results in a ratio of 2:1 as regards the dimensions of the two sides of the face. Corrections on the side facing toward the viewer thus take up double the space as those on the averted side. In a preferred embodiment, the combined editing tool takes this fact into account by a corresponding scaling factor. To this end, a partial profile-partial profile scaling factor is determined or stipulated, which stipulates the scaling between the right side of the face A3 and the left side of the face B3 in the partial profile view, so that changes on one of the two sides of the face can be applied to the other side of the face in a horizontally scaled way.

In a preferred embodiment, it is not necessary to maintain a corresponding symmetry of the face though. Instead, this symmetry function can be deactivated. This is particularly desirable if the face is to be constructed asymmetrically in a targeted way. Nevertheless, it is desirable in this case as well to ensure consistency of the different perspectives. Advantageous use is made of the combined editing tool here in that it associates each of the sides of the face in the different perspectives particularly by corresponding scaling factors. For example, preferably the right sides of the face A1, A2, and A3 of the front view (e.g. FIG. 3A), the profile view (FIG. 3B), and the partial profile view (FIG. 3C) are associated with each other at least partially by means of corresponding scaling factors. The same applies to the left sides of the face B1 and B3 of the front view (e.g. FIG. 3A) and the partial profile view (FIG. 3C). By analogy with the above-described association of the two sides of the face A3 and B3 by means of a partial profile-partial profile scaling factor, the association of the right sides of the face A1 and A3 between the front view and the partial profile view by a first partial profile-front factor and the association of the left sides of the face B1 and B3 between the front view and the partial profile view by a second partial profile-front scaling factor take place.

A pixel change in the front representation is applied to the semiprofile by the combined editing tool taking the corresponding scaling factor into account, and vice versa. Here, within the directly edited perspective, all pixels belonging to parts of the face visible in the respectively other perspective as well are taken into account. The areas thus form an editing area of the combined editing tool.

Preferably, these editing areas are particularly at least partially determined in the respective perspectives. For example, FIG. 3A particularly represents a first editing area 42 of a first perspective, for which a corresponding first editing area 46 of a second perspective (the profile view) exists in FIG. 3B. The first editing areas of the first and second perspectives are formed by the right side of the face. Here, the first editing area 42 of the first perspective and the first editing area 46 of the second perspective are associated with each other particularly by means of the combined editing tool.

In another or further preferred embodiment, a semiprofile view according to FIG. 3C could be provided as the second perspective in addition to the first perspective shown in FIG. 3A. While the left sides of the face B1 and B3 can substantially entirely be associated with each other, a part of the face visible in the front view of the right side of the face A1 is covered on the right side of the face A3 of the partial profile view. Therefore, only part of the right side of the face A1 is associated with the right side of the face A3 and relevant to the combined editing tool. To this end, preferably a first editing area 48 of the right side of the face is determined (e.g. FIG. 3D) at first, which then is associated with the right side of the face A3 in FIG. 3C preferably pixel by pixel.

The editing area 48 can e.g. be determined such that at first a corresponding editing area 50 is determined for the right side of the face, which particularly results from the center line and the boundary line of the first side of the face in the representation A3. In the transition to the front view in FIG. 3D, e.g. the entire determined editing area except for the area at the same level as the nose is shifted horizontally such that the center line (profile line) comes to rest in the center as a straight line. Moreover, the editing area is horizontally scaled according to a corresponding scaling factor for the connection between A1 and A3. In another embodiment, the editing area 48 can also be determined by manual support from a user, or a mask template is deposited, which can be scaled and individually adapted particularly depending on further parameters of the individual perspectives.

In a preferred embodiment, the method distinguishes between at least two editing modes, namely an adaptation in the background or afterward, and simultaneous editing.

Adaptation in the background of afterward can particularly be performed in a 2D editing mode, in which the changes, caused by the editing tool, in the other perspective, which is not directly edited, are not immediately displayed but e.g. only after completion of editing in the directly edited perspective following a request by a user. Here, the change is at first exclusively made e.g. in the front view, until the visual impression desired by the witness is obtained. Nothing is done with the associated views (e.g. a profile view and/or a partial profile view) at first. In one embodiment, they are not even displayed. In another embodiment, they are displayed but remain unchanged at first to not distract the witness. Only when the witness is satisfied with the adaptation in one perspective and the associated editing field or the combined editing tool is activated or the association is created will all individual changes be applied to the other perspectives potentially observed by the witness.

This is advantageous to the witness and the user in so far as they only have to concentrate on one perspective at the beginning, which is of particular importance when working with witnesses who have seen several perspectives of the offender, but in their memories are very much fixated on one specific view.

However, it is possible that one works with witnesses who are not quite sure which of the possible perspectives they saw or remember best. For these witnesses, it is important to be able to switch between the perspectives during the adaptation process. Even here, a witness is not forced to decide on one editing perspective in the delicate adaptation process. To this end, a method according to the invention offers the possibility of simultaneous editing by means of the combined editing tool in a preferred embodiment.

This special adaptation possibility is guaranteed by a special positioning of the simultaneously used editing tool. Here, the respective orientation of the associated perspectives plays a decisive role. As explained, in the case of the semiprofile, an extension or reduction of the editing space occurs, depending on the side of the face, while the adaptation of a profile only concentrates on the visible side of the face. This is particularly provided so that, when the tool (in particular the primary editing tool) is used on the side of the face of the front representation, which is not visible on the associated profile view, no corresponding second editing tool is activated there at all. In this situation, no simultaneous editing takes place in the profile view.

The precision of the simultaneous application of the editing tool becomes particularly clear in connection with the semiprofile. If there is a significant widening of the nostrils in the front view (e.g. FIG. 3D), the simultaneous editing will maybe only affect the nostril of the semiprofile (FIG. 3C) which is located on the side B3 facing toward the viewer. If this widening of the nostrils exceeds a certain degree, the nostril of the averted side becomes visible in the semiprofile as well. By tracing the stretched nostril of the left side of the face (in B1 or B3) by means of a drawing function or a (mirrored and scaled) copying function of the combined editing tool, the right nostril previously not visible and not present in the original image data can automatically be generated in the semiprofile view of A3. The tool is only applied in a simultaneous manner on the averted side (A3) when the change becomes visible, when e.g. the primary editing tool is located within the editing area 48 of darker color in FIG. 3D. Outside of this area, i.e. if the primary editing tool acts in the light area of A1 next to the nose, for example, the simultaneous tool switches off automatically and the secondary editing tool in the partial profile view is deactivated, whereas it is automatically switched on within the editing area 48. The user can fully rely on the determined editing areas and scaling factors, which do not allow the tool to operate simultaneously until the change is of relevance to the corresponding editing field. The same holds true for the profile. Only the editing field of the front view can be connected with the represented side of the profile. The side of the front view not represented in profile remains deactivated for editing.

Since the changes take place simultaneously, no confusing, separate adaptation processes for further perspectives come up for the witness. This is of particular importance when working with several perspectives, since the witness only has to face a detailed adaptation process once, i.e. for the perspective he observed best. He can take the changes of the other perspectives in. This is decisive for the construction of a facial composite in particular with respect to the witness's limited ability to concentrate, especially when they are crime victims. The witness must not be overstretched neither as far as content is concerned by working with several perspectives nor by the implementation of changes, which not only facilitates a construction in several views, but only makes it possible.

This high degree of correspondence, which is achieved by means of the methods described herein, makes it possible to visualize perspectives the witness did not per se observe. This makes it possible to exploit the two-dimensional area to one's advantage for the first time, which so far has only been possible with a three-dimensional model. Since in the described methods not only the explicit database content but also individual adaptations of the two-dimensional parts of the face are associated with each other, each change influences each supported perspective automatically. A 3D model based on this exact data cannot be more precise in its representation with respect to quality and quantity of the used witness information.

As pointed out above, even views of the offender which the witness did not observe but which are based on a specific perspective can be visualized in individual cases due to the high precision. This allows the connection between the association of the content of the sub-databases and the possibility of implementing individual adaptations simultaneously to all supported perspectives. The following example shows how effective the use of such a perspective not observed by the witness can be:

Let's assume a witness can only describe the suspected offender from the front view. In this case, one would represent this perspective as precisely as possible. In the course of the investigations, it turns out that the person was probably observed at another location as well. The witness of this observation only saw the person from the side though. Thus, at this time it is not clear whether the two observations relate to one and the same person. In order to answer this question, it is possible by means of the associated facial composite database to first of all retrieve the correspondingly referenced parts of the profile of the image originally created in the front view to subsequently apply all individual adaptations by the witness, which are also associated with the front view, to the profile. This profile image could serve as the forecast profile of the originally created front view and be presented to the witness who saw the person exclusively from this perspective.

This system and method can of course be supplemented by further perspectives. Since the two-dimensional data are based on photographic pictures, the creation and expansion of the database are possible without much effort, costs, and time. The invention is not limited to the representation of a face and outerwear. Instead, a representation of the offender as a whole can be implemented as well. In particular in cases in which the person has a special figure or posture, this representation offers an additional possibility to use information important to the investigation not only as a mere description, but to make it visible with all details described by the eye-witness. Particularly, specific features of the clothing, with respect to the combination of pieces of clothing, possible brand logos, various applications, damages, color characteristics etc., can be represented. Here, it is desirable to integrate any important detail an eye-witness could have observed theoretically with respect to the look of the person into the sub-databases.

Moreover, the whole-body representation offers further possibilities. For example, the created complete image of the offender can be represented virtually on a computer for the most realistic offender reconstruction. While existing systems for offender reconstruction at best place a neutral three-dimensional dummy in the crime scene, the whole-body representation, as can be realized in a very efficient way within the scope of the present invention, makes it possible to integrate the reconstruction of the offender into such a reconstruction for the first time. In this way, all relevant information could be reconstructed for the first time.

The reconstruction is not limited to the spatial component, but takes all person-related information into account as well. Of course, this includes not only the two-dimensional representation in several perspectives, but above all their three-dimensional implementation. The whole-body component is preferably divided into the following sub-databases:

upper half of the body
lower half of the body
accessories

Accessories preferably include all items carried by the offender, such as bags, objects used in the crime, or guns. Here, the strong point of a two-dimensional system becomes clear again. For example, if a bag left by the offender in the escape is found, e.g. three normal photographic pictures in the preferably three perspectives supported by the facial composite database are usually sufficient to be used for the complete range of representation options. For example, no 3D scanner is required and the data does not have to be processed in a time-consuming manner, instead, it is available immediately.

The witness's requests for changes are drawn in the two-dimensional area in one of the possible perspectives and are subsequently simultaneously applied to the other perspectives by means of the method described in the description of the combined editing tool with respect to the perspectives.

In this way, a whole-body representation of the wanted person is formed, which is fully consistent in the different perspectives. The representations of the head and the whole body therefore do not leave any gaps in the representation any more. The details obtained in the two-dimensional phase constitute an optimal collection of information for the three-dimensional implementation. With this representation, it was possible to visualize information only resulting from the movement of the offender, such as his way of waking or posture, for the first time.

With respect to FIG. 4, an exemplary system for implementing the invention is described. An exemplary system comprises a universal computing device in the form of a conventional computer environment 120, e.g. a personal computer (PC) 120, with a processor unit 122, a system memory 124, and a system bus 126, which combines a plurality of system components, among others the system memory 124 and the processor unit 122. The processor unit 122 can perform arithmetic, logical and/or control operations by accessing the system memory 124. The system memory 124 can store information and/or instructions for use in combination with the processor unit 122. The system memory 124 can include volatile and non-volatile memories, such as random access memory (RAM) 128 and read-only memory (ROM) 130. A basic input/output system (BIOS), which includes the basic routines that help transferring information between the elements within the PC 120, for example during booting, can be stored in the ROM 130. The system bus 126 can be one of many bus structures, among others a memory bus or a memory controller, a peripheral bus and a local bus, which uses a specific bus architecture from a plurality of bus architectures.

The PC 120 can further comprise a hard disk drive 132 for reading or writing a hard disk (not shown) and an external disk drive 134 for reading or writing a removable disk 136 or a removable data carrier. The removable disk can be a magnetic disk or a magnetic floppy disk for a magnetic disk drive or floppy disk drive or an optical floppy disk, such as a CD-ROM for an optical disk drive. The hard disk drive 132 and the external disk drive 134 are connected to the system bus 126 via a hard disk drive interface 138 and an external disk drive interface 140, respectively. The disk drives and the associated computer-readable media provide a non-volatile memory of computer-readable instructions, data structures, program modules, and other data for the PC 120. The data structures can comprise the relevant data for implementing a method as described above. Although the exemplarily described environment uses a disk drive (not shown) and an external disk 142, it is obvious to the skilled person that other types of computer-readable media capable of storing computer-accessible data can be used in the exemplary working environment, such as magnetic cassettes, flash memory cards, digital videodisks, random access memories, read-only memories, etc.

A plurality of program modules, in particular an operating system (not shown), one or more application programs 144, or program modules (not shown), and program data 146 can be stored on the disk drive, the external disk 142, the ROM 130, or the RAM 128. The application programs can comprise at least part of the functionality, as is shown in FIG. 1 or FIG. 2, for example.

A user can input commands and information, as described above, into the PC 120 by means of input devices, such as a keyboard 148 and a computer mouse 150. Other input devices (not shown) can comprise a microphone and/or other sensors, a joystick, a gamepad, a scanner or the like. These and other input devices can be connected with the processor unit 122 by means of a serial interface 152 coupled to the system 126, or can be connected by means of other interfaces, such as a parallel interface 154, a game port, or a universal serial bus (USB). Moreover, information can be printed with a printer 156. The printer 156 and other parallel input/output devices can be connected with the processor unit 122 by means of the parallel interface 154. A monitor 158 or other type(s) of display device(s) is/are connected with the system bus 126 by means of an interface, such as a video input/output 160. In addition to the monitor, the computer environment 120 can comprise other peripheral output devices (not shown), such as loudspeakers or acoustic outputs.

The computer environment 120 can communicate with other electronic devices, such as a computer, a phone with cord, a cordless phone, a personal digital assistant (PDA), a TV set, or the like. In order to communicate, the computer device 120 can operate in a networked environment, where connections to one or more electronic devices are used. FIG. 4 illustrates the computer environment that is networked with a remote computer 162. The remote computer 162 can be another computer environment, such as a server, a router, a network PC, an equivalent or a peer device, or other conventional network nodes, and can comprise many or all of the elements described above with respect to the computer device 120. The logical connections as illustrated in FIG. 4 comprise a local area network (LAN) 164 and a wide area network (WAN) 166. Such network environments are commonplace in offices, company computer networks, Intranet, and the Internet.

When a computer environment 120 is used in a LAN network environment, the computer environment 120 can be connected with the LAN 164 by a network input/output 168. When the computer environment 120 in used in a WAN network environment, the computer environment 120 can comprise a modem 170 or other means for establishing communication via the WAN 166. The modem 170, which can be internal and external with respect to the computer environment 120, is connected with the system bus 126 by means of the serial interface 152. In the network environment, program modules illustrated relative to the computer environment 120, or portions thereof can be stored in a remote storage device, which can be accessed on or by a remote computer 162 or be native. Moreover, other data relevant to the above-described method or system can be available in a manner to be accessible on or by a remote computer 162.

LIST OF REFERENCE NUMERALS 10 image database
12a, ... 12f image area data sets of the image database
14 front image data set
16 profile image data set
18a, ... 18f image area data sets of the front image data set
20a, ... 20f image area data sets of the profile image data set
22 front image output area
24 profile image output area
26a, ... 26f front image data elements
28a, ... 28f profile image data elements
30 first photographic picture
32 second photographic picture
40 center line (profile line)
42-50 editing areas
120 computer environment
122 processor unit
124 system memory
126 system bus
128 random access memory (RAM)
130 read-only memory (ROM)
132 hard disk drive
134 disk drive
136 removable disk
138 hard disk drive interface
140 disk drive interface
142 external disk
144 application program
146 program data
148 keyboard
150 computer mouse
152 serial interface
154 parallel interface
156 printer
158 monitor
160 video input/output
162 remote computer
164 local area network (LAN)
166 wide area network (WAN)
168 network input/output

The invention claimed is:

1. A computer-implemented method of constructing facial composites, comprising:
    providing an image database comprising a plurality of first image data elements, wherein each first image data element represents a part of a human face in a first perspective, and wherein for every first image data element the image database comprises a corresponding second image data element such that the second image data element represents at least partially the same part of the same human face in a second perspective;
    electronically acquiring a user input for selection of a first image data element of a first part of the human face;
    electronically acquiring a user input for selection of a first image data element of a second part the human face;
    graphically representing the selected first image data elements in a first display area of a graphical user interface;
    electronically determining the corresponding second image data elements corresponding to the selected first image data elements; and
    graphically representing the determined second image data elements in a second display area of the graphical user interface,
    wherein at least one of the first and second perspectives represents a partial profile view, and the other of the first and second perspectives represents a front view, and wherein the method comprises:
    determining a first editing area of the partial profile view, wherein the first editing area represents a first side of the face in the partial profile view, and a corresponding first editing area of the front view, wherein the first editing area represents the first side of the face in the front view;
    determining a first scaling factor;
    acquiring a user input for graphically editing the representation in the first editing area of the partial profile view or the front view, which comprises shifting at least one pixel of at least one of the representation in the first editing area of the partial profile view or the front view and a primary editing tool represented in the first editing area of the partial profile view or the front view by a primary position change stipulated by the user input, which includes a primary horizontal and/or a primary vertical component of the position change; and
    shifting at least one pixel of at least one of the representation in the first editing area of the front view or partial profile view and a secondary editing tool represented in the first editing area of the front view or partial profile view by a secondary position change determined depending on the user input and the first scaling factor, which includes at least one of a secondary horizontal and a secondary vertical component, such that the secondary horizontal component corresponds to the primary horizontal component scaled by the first scaling factor and the secondary vertical component corresponds to the primary vertical component, wherein the scaling factor is based on a ratio of the distances of marked pixels from a center line of the human face.

2. The method according to claim 1, further comprising:
acquiring a user input for at least one of positioning, orienting, and dimensioning the representation of the first image data element of the second part of the face in the first display area relative to the representation of the first image data element of the first part of the face in the first display area; and
adapting at least one of a position, an orientation, and a dimension of the representation of the corresponding second image data element of the second part of the face in the second display area relative to the representation of the second image data element of the first part of the face in the second display area depending on the acquired user input for the at least one of positioning, orienting, and dimensioning in the first display area.

3. The method according to claim 2, further comprising activating a two-dimensional (2D) editing mode in which during the acquisition of user inputs for the at least one of selecting, positioning, orienting, and dimensioning first image data elements, the first display area, but not the second display area, is represented graphically.

4. The method according to claim 2 further comprising activating a three-dimensional (3D) editing mode in which during the acquisition of user inputs for selecting, positioning, orienting, and dimensioning of the first image data elements, the first display area and the second display area are represented graphically at the same time.

5. The method according to claim 4, further comprising:
acquiring a user input for at least one of positioning, orienting, and dimensioning the representation of the second image data element of the second part of the face in the second display area relative to the representation of the second image data element of the first part of the face in the second display area; and
adapting at least one of a position, orientation, and dimension of the representation of the corresponding first image data element of the second part of the face in the first display area relative to the representation of the first image data element of the first part of the face in the first display area depending on the acquired user input for the at least one of positioning, orienting, and dimensioning in the second display area.

6. The method according to claim 1, wherein the image database comprises a plurality of image area data sets, each of which comprises a plurality of image data elements such that image data elements included in different image area data sets represent different parts of human faces, while different image data elements within one image area data set represent substantially the same part of the face of different human faces.

7. The method according to claim 1, wherein the database is provided such that for each first image data element the database comprises a corresponding third image data element, such that the third image data element represents at least partially the same part of the face of the same human face in a third perspective, wherein the method comprises determining the corresponding third image data elements corresponding to the selected first image data elements.

8. The method according to claim 7, wherein the image database is provided such that at least one of the first, second, and third perspective(s) comprises at least one of a front view, a profile view, and a semiprofile view of the respective human face.

9. The method according to claim 8, further comprising:
constructing a 3D model of a composite human face from the selected first image data elements and at least one of the determined corresponding second and third image data elements; and
graphically representing the 3D-modeled human face in a further perspective different from the first and second perspectives.

10. The method of claim 1, further comprising:
constructing at least one of a two-dimensional (2D) model or three dimensional (3D) model of a composite human face from the selected first image data elements and corresponding second image data elements.

11. A computer-implemented method of constructing facial composites, comprising:
providing an image database comprising a plurality of first image data elements, wherein each first image data element represents a part of a human face in a first perspective, and wherein for every first image data element the image database comprises a corresponding second image data element such that the second image data element represents at least partially the same part of the same human face in a second perspective;
electronically acquiring a user input for selection of a first image data element of a first part of a human face;
electronically acquiring a user input for selection of a first image data element of a second part of a human face;
graphically representing the selected first image data elements in a first display area of a graphical user interface;
electronically determining the corresponding second image data elements corresponding to the selected first image data elements; and
graphically representing the determined second image data elements in a second display area of the graphical user interface,
wherein at least one of the first and second perspectives represents a partial profile view, and wherein the method comprises:
determining a first editing area of the first or second display area, wherein the first editing area represents a side of the face partially averted in a viewing direction in the first or second perspective, and a second editing area of the first or second display area, wherein the second editing area represents a side of the face facing toward the viewing direction;
determining a scaling factor;
acquiring a user input for graphically editing the representation in the first editing area, which comprises shifting at least one pixel of at least one of the representation in the first or second editing area and a primary editing tool represented in the first or second editing area by a primary position change stipulated by the user input, which includes one of a primary horizontal and a primary vertical component of the position change; and
shifting at least one pixel of at least one of the representation in the second or first editing area and a secondary editing tool represented in the second or first editing area by a secondary position change determined depending on the user input and the scaling factor, which includes one of a secondary horizontal and a secondary vertical component such that the secondary horizontal component corresponds to the primary horizontal component scaled by the scaling factor and the secondary vertical component corresponds to the primary vertical component, wherein the scaling factor is based on a ratio of the distances of marked pixels from a center line of the human face.

12. The method according to claim 11, wherein the image database comprises a plurality of image area data sets, each of which comprises a plurality of image data elements such that image data elements included in different image area data sets represent different parts of human faces, while different image data elements within one image area data set represent substantially the same part of the face of different human faces.

13. The method according to claim 11, further comprising:
acquiring a user input for at least one of positioning, orienting, and dimensioning the representation of the first image data element of the second part of the face in the first display area relative to the representation of the first image data element of the first part of the face in the first display area; and
adapting at least one of a position, an orientation, and a dimension of the representation of the corresponding second image data element of the second part of the face in the second display area relative to the representation of the second image data element of the first part of the face in the second display area depending on the acquired user input for the at least one of positioning, orienting, and dimensioning in the first display area.

14. The method according to claim 13, further comprising activating a two-dimensional (2D) editing mode in which during the acquisition of user inputs for the at least one of selecting, positioning, orienting, and dimensioning first image data elements, the first display area, but not the second display area, is represented graphically.

15. The method according to claim 13 further comprising activating a three-dimensional (3D) editing mode in which during the acquisition of user inputs for selecting, positioning, orienting, and dimensioning of the first image data elements, the first display area and the second display area are represented graphically at the same time.

16. The method according to claim 15, further comprising:
acquiring a user input for at least one of positioning, orienting, and dimensioning the representation of the second image data element of the second part of the face in the second display area relative to the representation of the second image data element of the first part of the face in the second display area; and
adapting at least one of a position, orientation, and dimension of the representation of the corresponding first image data element of the second part of the face in the first display area relative to the representation of the first image data element of the first part of the face in the first display area depending on the acquired user input for the at least one of positioning, orienting, and dimensioning in the second display area.

17. The method according to claim 11, wherein the database is provided such that for each first image data element the database comprises a corresponding third image data element, such that the third image data element represents at least partially the same part of the face of the same human face in a third perspective, wherein the method comprises determining the corresponding third image data elements corresponding to the selected first image data elements.

18. The method according to claim 17, wherein the image database is provided such that at least one of the first, second, and third perspective(s) comprises at least one of a front view, a profile view, and a semi-profile view of the respective human face.

19. The method according to claim 18, further comprising:
constructing a 3D model of a composite human face from the selected first image data elements and at least one of the determined corresponding second and third image data elements; and
graphically representing the 3D-modeled human face in a further perspective different from the first and second perspectives.

20. The method of claim 11, further comprising:
constructing at least one of a two-dimensional (2D) model or three dimensional (3D) model of a composite human face from the selected first image data elements and corresponding second image data elements.

21. A facial composite construction computer system, comprising:
a processor;
an image database comprising a plurality of first image data elements, wherein each first image data element represents a part of a human face in a first perspective, and wherein for every first image data element in the image database comprises a corresponding second image data element, such that the second image data element represents at least partially the same part of the same human face in a second perspective;
an input interface configured to:
acquire a user input for selection of a first image data element of a first part of a human face; and
acquire a user input for selection of a first image data element of a second part of a human face;
a data processing device for determining the corresponding second image data elements corresponding to the selected first image data elements; and
a graphical output interface configured to:
graphically illustrate the selected first image data elements in a first display area; and
graphically illustrate the determined second image data elements in a second display area,
wherein at least one of the first and second perspectives represents a partial profile view, and the other of the first and second perspectives represents a front view, and wherein the system is further configured to:
determine a first editing area of the partial profile view, wherein the first editing area represents a first side of the face in the partial profile view, and a corresponding first editing area of the front view, wherein the first editing area represents the first side of the face in the front view;
determine a first scaling factor;
acquire a user input that graphically edits the representation in the first editing area of the partial profile view or the front view, which comprises shifting at least one pixel of at least one of the representation in the first editing area of the partial profile view or the front view and a primary editing tool represented in the first editing area of the partial profile view or the front view by a primary position change stipulated by the user input, which includes a primary horizontal and/or a primary vertical component of the position change;
shift at least one pixel of at least one of the representation in the first editing area of the front view or partial profile view and a secondary editing tool represented in the first editing area of the front view or partial profile view by a secondary position change determined depending on the user input and the first scaling factor, which includes at least one of a secondary horizontal and a secondary vertical component, such that the secondary horizontal component corresponds to the primary horizontal component scaled by the first scaling factor and the secondary vertical component corresponds to the primary vertical component, wherein the scaling factor is based on a ratio of the distances of marked pixels from a center line of the human face.

22. The system of claim 21, wherein the wherein the data processing device and graphical output interface are configured to cooperatively graphically construct at least one of a two-dimensional (2D) model or three dimensional (3D) model of a composite human face from the selected first image data elements and corresponding second image data elements.

23. A computer program product, which comprises machine-readable program code stored in a non-transitory storage media, which, when loaded on a computer, is suitable for executing a method of constructing facial composites, the method comprising:
provides an image database comprising a plurality of first image data elements, wherein each first image data element represents a part of a human face in a first perspective, and wherein for every first image data element the image database comprises a corresponding second image data element such that the second image data element represents at least partially the same part of the same human face in a second perspective;
acquiring a user input for selection of a first image data element of a first part of a human face;
acquiring a user input for selection of a first image data element of a second part of a human face;
graphically representing the selected first image data elements in a first display area of a graphical user interface;
determining the corresponding second image data elements corresponding to the selected first image data elements; and
graphically representing the determined second image data elements in a second display area of the graphical user interface, wherein at least one of the first and second perspectives represents a partial profile view, and the other of the first and second perspectives represents a front view, and wherein the method comprises:
determining a first editing area of the partial profile view, wherein the first editing area represents a first side of the face in the partial profile view, and a corresponding first editing area of the front view, wherein the first editing area represents the first side of the face in the front view;
determining a first scaling factor;
acquiring a user input for graphically editing the representation in the first editing area of the partial profile view or the front view, which comprises shifting at least one pixel of at least one of the representation in the first editing area of the partial profile view or the front view and a primary editing tool represented in the first editing area of the partial profile view or the front view by a primary position change stipulated by the user input, which includes a primary horizontal and/or a primary vertical component of the position change; and
shifting at least one pixel of at least one of the representation in the first editing area of the front view or partial profile view and a secondary editing tool represented in the first editing area of the front view or partial profile view by a secondary position change determined depending on the user input and the first scaling factor, which includes at least one of a secondary horizontal and a secondary vertical component, such that the secondary horizontal component corresponds to the primary horizontal component scaled by the first scaling factor and the secondary vertical component corresponds to the primary vertical component, wherein the scaling factor is based on a ratio of the distances of marked pixels from a center line of the human face.

24. The computer program product of claim 23, wherein the method further comprises:
constructing at least one of a two-dimensional (2D) model or three dimensional (3D) model of a composite human face from the selected first image data elements and corresponding second image data elements.

25. A facial composite construction computer system, comprising:
a processor;
an image database comprising a plurality of first image data elements, wherein each first image data element represents a part of a human face in a first perspective, and wherein for every first image data element in the image database comprises a corresponding second image data element, such that the second image data element represents at least partially the same part of the same human face in a second perspective;
an input interface configured to:
acquire a user input for selection of a first image data element of a first part of a human face; and
acquire a user input for selection of a first image data element of a second part of a human face;
a data processing device for determining the corresponding second image data elements corresponding to the selected first image data elements; and
a graphical output interface configured to:
graphically illustrate the selected first image data elements in a first display area; and
graphically illustrate the determined second image data elements in a second display area,
wherein at least one of the first and second perspectives represents a partial profile view, and wherein the system is further configured to:
determine a first editing area of the first or second display area, wherein the first editing area represents a side of the face partially averted in a viewing direction in the first or second perspective, and a second editing area of the first or second display area, wherein the second editing area represents a side of the face facing toward the viewing direction;
determine a scaling factor;
acquire a user input for graphically editing the representation in the first editing area, which comprises shifting at least one pixel of at least one of the representation in the first or second editing area and a primary editing tool represented in the first or second editing area by a primary position change stipulated by the user input, which includes one of a primary horizontal and a primary vertical component of the position change;
shift at least one pixel of at least one of the representation in the second or first editing area and a secondary editing tool represented in the second or first editing area by a secondary position change determined depending on the user input and the scaling factor, which includes one of a secondary horizontal and a secondary vertical component such that the secondary horizontal component corresponds to the primary horizontal component scaled by the scaling factor and the secondary vertical component corresponds to the primary vertical component, wherein the scaling factor is based on a ratio of the distances of marked pixels from a center line of the human face.

26. The system of claim 25, wherein the wherein the data processing device and graphical output interface are configured to cooperatively graphically construct at least one of a two-dimensional (2D) model or three dimensional (3D) model of a composite human face from the selected first image data elements and corresponding second image data elements.

27. A computer program product, which comprises machine-readable program code stored in a non-transitory storage media, which, when loaded on a computer, is suitable for executing a method of constructing facial composites, the method comprising:
- providing an image database comprising a plurality of first image data elements, wherein each first image data element represents a part of a human face in a first perspective, and wherein for every first image data element the image database comprises a corresponding second image data element such that the second image data element represents at least partially the same part of the same human face in a second perspective;
- electronically acquiring a user input for selection of a first image data element of a first part of a human face;
- electronically acquiring a user input for selection of a first image data element of a second part of a human face;
- graphically representing the selected first image data elements in a first display area of a graphical user interface;
- electronically determining the corresponding second image data elements corresponding to the selected first image data elements; and
- graphically representing the determined second image data elements in a second display area of the graphical user interface,
- wherein at least one of the first and second perspectives represents a partial profile view, and wherein the method comprises:
- determining a first editing area of the first or second display area, wherein the first editing area represents a side of the face partially averted in a viewing direction in the first or second perspective, and a second editing area of the first or second display area, wherein the second editing area represents a side of the face facing toward the viewing direction;
- determining a scaling factor;
- acquiring a user input for graphically editing the representation in the first editing area, which comprises shifting at least one pixel of at least one of the representation in the first or second editing area and a primary editing tool represented in the first or second editing area by a primary position change stipulated by the user input, which includes one of a primary horizontal and a primary vertical component of the position change; and
- shifting at least one pixel of at least one of the representation in the second or first editing area and a secondary editing tool represented in the second or first editing area by a secondary position change determined depending on the user input and the scaling factor, which includes one of a secondary horizontal and/or a secondary vertical component such that the secondary horizontal component corresponds to the primary horizontal component scaled by the scaling factor and the secondary vertical component corresponds to the primary vertical component, wherein the scaling factor is based on a ratio of the distances of marked pixels from a center line of the human face.

28. The computer program product of claim 27, wherein the method further comprises:
- constructing at least one of a two-dimensional (2D) model or three dimensional (3D) model of a composite human face from the selected first image data elements and corresponding second image data elements.

* * * * *

UNITED STATES PATENT AND TRADEMARK OFFICE
CERTIFICATE OF CORRECTION

PATENT NO.         : 9,235,320 B2  
APPLICATION NO.    : 14/008370  
DATED              : January 12, 2016  
INVENTOR(S)        : Uwe Kinn Page 1 of 1

It is certified that error appears in the above-identified patent and that said Letters Patent is hereby corrected as shown below:

In the Claims:

At column 33, line 5, claim 22, please delete the words "wherein the" after the words "wherein the" and before the word "data"; and At column 34, line 65, claim 26, please delete the words "wherein the" after the words "wherein the" and before the word "data".

Signed and Sealed this  
Twenty-fourth Day of May, 2016

Michelle K. Lee  
*Director of the United States Patent and Trademark Office*